(12) United States Patent
Fiorese et al.

(10) Patent No.: US 11,405,803 B2
(45) Date of Patent: Aug. 2, 2022

(54) METHODS AND SYSTEMS FOR ONLINE SERVICES APPLICATIONS AND APPLICATION FUNCTIONS TO PROVIDE UE-GENERATED INFORMATION TO NETWORK DATA ANALYTICS TO SUPPORT NETWORK AUTOMATION AND OPTIMIZATION

(71) Applicant: Telefonaktiebolaget LM Ericsson (publ), Stockholm (SE)

(72) Inventors: Virgilio Fiorese, McKinney, TX (US); Vinicius Samuel Landi Fiorese, São Paulo (BR); Peter Hedman, Helsingborg (SE); Nipun Sharma, New Delhi (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/254,509

(22) PCT Filed: Jun. 20, 2018

(86) PCT No.: PCT/IB2018/054565
§ 371 (c)(1),
(2) Date: Dec. 21, 2020

(87) PCT Pub. No.: WO2019/243874
PCT Pub. Date: Dec. 26, 2019

(65) Prior Publication Data
US 2021/0219151 A1    Jul. 15, 2021

(51) Int. Cl.
*H04W 24/02* (2009.01)
*H04W 36/00* (2009.01)

(52) U.S. Cl.
CPC ....... *H04W 24/02* (2013.01); *H04W 36/0055* (2013.01)

(58) Field of Classification Search
CPC ..... H04W 24/02; H04W 24/08; H04W 48/18; H04W 28/24; H04W 36/14; H04W 48/06;
(Continued)

(56) References Cited

U.S. PATENT DOCUMENTS 10,637,753 B1 * 4/2020 Taft .................... H04L 41/04
10,887,799 B2 * 1/2021 Srivastava ............ H04L 67/148
(Continued)

FOREIGN PATENT DOCUMENTS

CN     110167068 A  *  8/2019  ............ H04W 40/24
CN     110461027 A  *  11/2019
(Continued)

OTHER PUBLICATIONS

Translation of CN-110461027-A, Su et al. May 7, 2018, retrieved on Dec. 8, 2021 from PE2E Search (Year: 2018).*
(Continued)

*Primary Examiner* — Matthew C Sams
(74) *Attorney, Agent, or Firm* — Withrow & Terranova, PLLC

(57) ABSTRACT

Methods and systems for online services applications and application functions to provide User Equipment (UE)-generated information to network data analytics to support network automation and optimization are provided. According to one aspect of the present disclosure, a method for an online services application or Application Function (AF) to provide UE-Generated Information (UGI) to support network automation and optimization comprises, at a Network Data Analytics (NWDA) function: receiving UGI that was collected by a UE or by an online services AF; generating network automation and optimization information based on at least some of the received UGI; and sending the network automation and optimization information to a Radio Access Network (RAN).

26 Claims, 12 Drawing Sheets

(58) Field of Classification Search
CPC ... H04W 48/16; H04W 72/1257; H04W 8/18;
H04W 84/12; H04W 12/06; H04W 12/12;
H04W 12/128; H04W 16/14; H04W
24/10; H04W 28/0268; H04W 28/08;
H04W 28/16; H04W 28/22; H04W 28/26;
H04W 36/0011; H04W 36/0022; H04W
36/0066; H04W 36/0072; H04W 36/08;
H04W 36/12; H04W 36/22; H04W
36/385; H04W 4/021; H04W 4/029;
H04W 40/02; H04W 40/24; H04W 40/36;
H04W 56/00; H04W 60/00; H04W
64/003; H04W 72/087; H04W 72/1268;
H04W 72/1273; H04W 76/12; H04W
8/005; H04W 84/042; H04W 88/08;
H04W 88/16; H04W 92/10; H04L 41/14;
H04L 41/5009; H04L 41/0803; H04L
41/0816; H04L 41/0893; H04L 41/5096;
H04L 43/0876; H04L 43/12; H04L
63/1433; H04L 63/20; H04L 1/0002;
H04L 1/0026; H04L 41/046; H04L
41/0843; H04L 41/0859; H04L 41/0879;
H04L 41/0886; H04L 41/0896; H04L
41/12; H04L 41/22; H04L 41/5006; H04L
41/5016; H04L 41/5022; H04L 41/5025;
H04L 43/026; H04L 43/045; H04L 43/06;
H04L 43/062; H04L 43/08; H04L 43/103;
H04L 43/50; H04L 45/34; H04L 47/125;
H04L 47/14; H04L 47/215; H04L 47/24;
H04L 47/263; H04L 47/283; H04L
47/6215; H04L 61/6059; H04L 63/0272;
H04L 63/029; H04L 63/0823; H04L
63/10; H04L 63/1408; H04L 63/1425;
H04L 63/164; H04L 65/1069; H04L
67/10; H04L 67/12; H04L 67/141; H04L
67/148; H04L 67/16; H04L 67/26; H04L
67/32; H04L 67/34; H04L 69/22
See application file for complete search history.

(56) References Cited

U.S. PATENT DOCUMENTS

| | | | | |
|---|---|---|---|---|
| 11,129,092 | B2* | 9/2021 | Young | H04W 48/18 |
| 2009/0161629 | A1 | 6/2009 | Purkayastha et al. | |
| 2016/0197799 | A1* | 7/2016 | Clemm | H04L 41/0803 |
| | | | | 709/202 |
| 2016/0255050 | A1* | 9/2016 | Grayson | H04L 63/1425 |
| | | | | 726/1 |
| 2017/0332282 | A1* | 11/2017 | Dao | H04W 72/087 |
| 2018/0013680 | A1* | 1/2018 | Bull | H04W 16/14 |
| 2018/0262924 | A1* | 9/2018 | Dao | H04W 72/1257 |
| 2018/0359672 | A1* | 12/2018 | Keller | H04L 67/141 |
| 2019/0102440 | A1* | 4/2019 | Tabak | G06F 9/547 |
| 2019/0123983 | A1* | 4/2019 | Rao | H04L 41/0893 |
| 2020/0252813 | A1* | 8/2020 | Li | G06Q 20/382 |

FOREIGN PATENT DOCUMENTS

| | | | | |
|---|---|---|---|---|
| WO | 2015103426 A1 | 7/2015 | | |
| WO | WO-2017137089 A1 * | 8/2017 | | H04W 8/18 |
| WO | 2017193970 A1 | 11/2017 | | |
| WO | WO-2019032968 A1 * | 2/2019 | | H04L 41/14 |
| WO | WO-2019129115 A1 * | 7/2019 | | H04W 92/10 |
| WO | WO-2019157855 A1 * | 8/2019 | | H04W 28/24 |
| WO | WO-2019158777 A1 * | 8/2019 | | H04W 24/08 |
| WO | 2019234479 A1 | 12/2019 | | |

OTHER PUBLICATIONS

Author Unknown, Technical Specification Group Services and System Aspects; Study of Enablers for Network Automation for 5G (Release 16); Technical Report 23.791, Version 0.3.0, 3GPP Organizational Partners, Apr. 2018, 19 pages.

Author Unknown, Technical Specification Group Services and System Aspects; System Architecture for the 5G System; Stage 2 (Release 15); Technical Specification 23.501, Version 15.1.0, 3GPP Organizational Partners, Mar. 2018, 201 pages.

Author Unknown, Technical Specification Group Services and System Aspects; Procedures for the 5G System; Stage 2 (Release 15); Technical Specification 23.502, Version 15.1.0, 3GPP Organizational Partners, Mar. 2018, 285 pages.

Author Unknown, Technical Specification Group Services and System Aspects; Policy and Charging Control Framework for the 5G System; Stage 2 (Release 15); Technical Specification 23.503, Version 15.1.0, 3GPP Organizational Partners, Mar. 2018, 65 pages.

Author Unknown, Technical Specification Group Services and System Aspects; Architecture enhancements to facilitate communications with packet data networks and applications (Release 14); Technical Specification 23.682, Version 14.8.0, 3GPP Organizational Partners, Jun. 2018, 108 pages.

Author Unknown, Technical Specification Group Services and System Aspects; Architecture enhancements to facilitate communications with packet data networks and applications (Release 15); Technical Specification 23.682, Version 15.4.0, 3GPP Organizational Partners, Mar. 2018, 124 pages.

Hodges, Adam, "The Design and Implementation of an Over-the-top Cloud-based Vertical Handover Decision Service for Heterogeneous Wireless Networks," Clemson University TigerPrints, All Theses, 2014, 71 pages.

Huawei, et al., "S2-185367: Use case for data collection from UEs for certain application(s)," Third Generation Partnership Project (3GPP), SA WG2 Meeting #127Bis, May 28-Jun. 1, 2018, 3 pages, Newport Beach, US.

Huawei, et al., "S2-185706: Solution for Key Issue 5: NWDAF-Assisted QoS Profile Provisioning," Third Generation Partnership Project (3GPP), SA WG2 Meeting #127, Apr. 16-20, 2018, 6 pages, Sanya, China.

Invitation to Pay Additional Fees and Partial Search for International Patent Application No. PCT/IB2018/054181, dated Oct. 8, 2018, 18 pages.

International Search Report and Written Opinion for International Patent Application No. PCT/IB2018/054181, dated Dec. 3, 2018, 23 pages.

International Search Report and Written Opinion for International Patent Application No. PCT/IB2018/054565, dated Sep. 24, 2018, 22 pages.

* cited by examiner

METHODS AND SYSTEMS FOR ONLINE SERVICES APPLICATIONS AND APPLICATION FUNCTIONS TO PROVIDE UE-GENERATED INFORMATION TO NETWORK DATA ANALYTICS TO SUPPORT NETWORK AUTOMATION AND OPTIMIZATION

This application is a 35 U.S.C. § 371 national phase filing of International Application No. PCT/IB2018/054565, filed Jun. 20, 2018, the disclosure of which is incorporated herein by reference in its entirety.

TECHNICAL FIELD

The present disclosure relates to network automation and optimization processes.

BACKGROUND

Modern telecommunications networks are much more than a vehicle for telephone calls: they provide an infrastructure for a wide variety of data traffic, including data from online service providers such as social media platforms, search engines, Over-the-Top (OTT) service providers, entertainment and programming providers, and many more types of online services, which are herein referred to collectively as "service applications" or "online services," and their providers are herein referred to as "service applications providers" or "online services providers." Service applications provided by a network operator are herein referred to as native service applications, and those not-provided by the network operator are herein referred to as third party service applications.

Online service providers typically employ servers or other network entities to collect, maintain, and make use of Quality of Service (QoS) information, Quality of Experience (QoE) information, and other types of information related to the user's interaction with the online service. In Third Generation Partnership Project (3GPP) networks, an entity called an Application Function (AF) supports control of bearer resources and flow based bearer charging. An entity that performs these functions on behalf of an online service or an online services provider is herein referred to as an online services AF. AF within the domain of a network operator, which may be, for example, a Mobile Network Operator (MNO) domain, a Public Land Mobile Network (PLMN) domain, etc., is referred to as a trusted AF, while an AF outside the network operator's domain is referred to as an untrusted AF or an external AF. Both would have User Plane (UP) traffic after a User Plane Function (UPF) but the control plane of trusted AF would happen in the service bus while the control plane for an untrusted AF needs to go through a Network Exposure Function (NEF).

Because an AF may provide "backend" services, i.e., operating as the server in a client-server relationship, this kind of AF may be referred to herein as an Application Function Backend (AFBE). Since online services providers have access to data from a large pool of devices operating under a wide variety of conditions, it will be understood that the kinds of information available to an AFBE could be very useful for a network operator to get a comprehensive picture of the health and performance of the network (or of other networks).

However, as stated in the 3GPP Technical Report (TR) 23.791, Version 0.3.0 (2018-04), Section 5.1.1.1, there is a problem related to Fifth Generation (5G) Core Systems that could also apply to Long Term Evolution (LTE) Forth Generation (4G) Third Generation (3G)/Second Generation (2G) analytics—namely, that while network operators have already been able to collect some network information, e.g., obtaining network data via Operations and Management (O&M) functions, network operators lack information from the service applications, especially from third party service applications.

More specifically, there is currently no mechanism to get from online services AFs information that might be useful for network automation or performance optimization. As a result, it is difficult for network operators to measure the actual service experience of the users and also don't know how to optimize the service, e.g., by improving network automation or performance.

SUMMARY

Methods and systems for online services applications and application functions to provide User Equipment (UE)-generated information to network data analytics to support network automation and optimization are provided herein. Although described herein in the context of a Fifth Generation (5G) network, the same principles may be applied to other network technologies, including, but not limited to, Long Term Evolution (LTE) and Fourth Generation (4G) networks.

According to one aspect of the present disclosure, a method for an online services application or Application Function (AF) to provide UE-Generated Information (UGI) to support network automation and optimization comprises, at a Network Data Analytics function (NWDA): receiving UGI that was collected by an online services application within or connected to a UE or by an online services AF; generating network automation and optimization information based on at least some of the received UGI; and sending the network automation and optimization information to a Radio Access Network (RAN).

In some embodiments, receiving the UGI comprises receiving the UGI from the online services AF via a Network Exposure Function (NEF).

In some embodiments, receiving the UGI comprises receiving the UGI from the UE via a User Plane Function (UPF).

In some embodiments, receiving the UGI comprises receiving, from the UE, the UGI collected by an online services application on the UE.

In some embodiments, receiving the UGI comprises receiving the UGI using a Representational State Transfer (REST)-ful Application Programming Interface (API).

In some embodiments, sending the network automation and optimization information to the RAN comprises sending the network automation and optimization information to the RAN via a Core Access and Mobility Management Function (AMF).

In some embodiments, generating the network automation and optimization information comprises generating mobility management and optimization information.

In some embodiments, sending the network automation and optimization information to the RAN comprises sending the network automation and optimization information to a Next Generation RAN (NG-RAN).

In some embodiments, sending the network automation and optimization information comprises sending a handover request comprising at least one of: a Radio Access Technology (RAT) Frequency Selection Priority (RFSP) index; and a Subscriber Profile Identifier (SPID).

In some embodiments, sending the network automation and optimization information comprises sending a handover request comprising at least one of: a 5G Quality of Service (QoS) Indicator (5QI); a QoS Class Indicator (QCI); a 5G Temporary Mobile Subscriber Identity (TMSI) range; and AMF Core Network (CN) assistance information.

In some embodiments, sending the network automation and optimization information to the RAN comprises sending the network automation and optimization information to the RAN via a Network Slice Selection Function (NSSF), and the AMF.

In some embodiments, sending the network automation and optimization information comprises sending Network Slice Selection Assistance Information (NSSAI) with actual QoS information.

In some embodiments, sending the network automation and optimization information to the RAN comprises sending the network automation and optimization information to the RAN via an Operations and Management (O&M) node.

In some embodiments, sending the network automation and optimization information comprises sending a handover request comprising at least one of: a RFSP index; and a SPID.

In some embodiments, sending the network automation and optimization information comprises sending a handover request comprising at least one of: a 5QI; a QCI; a TMSI range; and AMF CN assistance information.

In some embodiments, the UGI comprises information that was provided by at least one reporting UE.

In some embodiments, the UGI comprises at least one of: information identifying the reporting UE; location, positioning, or sensor information; network coverage information; signal quality information; information identifying a network connection; device specific information; and information related to nearby devices.

In some embodiments, the information identifying the reporting UE comprises at least one of: a Media Access Control (MAC) address; an International Mobile Subscriber Identity (IMSI); an International Mobile Equipment Identity (IMEI); and a Mobile Station International Subscriber Directory Number (MSISDN).

In some embodiments, the location, positioning, or sensor information comprises at least one of: a light/brightness level of the reporting UE; a noisy/sounds level around of the reporting UE; an infrared/motion level around of the reporting UE; a heat/temperature level of the reporting UE; an air humidity level of the reporting UE a latitude and longitude of the reporting UE; an altitude of the reporting UE; and a speed of movement of the reporting UE.

In some embodiments, the network coverage information comprises at least one of: information relating to a lack of coverage by any network technology supported by the reporting UE; information relating to a lack of Third Generation Partnership Project (3GPP) coverage but a presence of non-3GPP coverage by the reporting UE; an indication of a type of the non-3GPP coverage detected by the reporting UE; and an indication of a change of mobile network technologies by the reporting UE.

In some embodiments, the signal quality information comprises information relating to at least one of: a signal strength; a Signal and Interference to Noise Ratio (SINR); a quality of an air interface; average user latency; average jitter; average packet loss; average ping time; average Time Of Arrival (TOA) of a first packet; channel bandwidth capability; average user throughput; and actual user throughput of most used applications and services; of any network technology supported by the reporting UE.

In some embodiments, the information identifying the network connection comprises at least one of: a RAT; a Public Land Mobile Network (PLMN) Identifier (ID); a list of Cell Identifiers (Cell IDs) of cells detected by the reporting UE; a list of carriers of each Cell ID of the cells detected by the reporting UE; a list of Non-3GPP network identifiers; and a list of WiFi Service Set Identifiers (SSIDs).

In some embodiments, the device specific information comprises information specific to the reporting UE.

In some embodiments, the information specific to the reporting UE comprises at least one of: a preferred network node of the reporting UE; a RAT supported by the reporting UE; an indication that WiFi was enabled or disabled on the reporting UE; a model number of the reporting UE; a serial number of the reporting UE; a device identifier of the reporting UE; a device type of the reporting UE; a date and/or time that the reporting UE reported the information; an operating system version of the reporting UE; a battery level of the reporting UE; an identity for advertisers of the reporting UE; a Google Play Service ID of the reporting UE; a time of service of the reporting UE; and an application version code of the reporting UE.

In some embodiments, the information related to nearby devices comprises Key Performance Indicators (KPIs) of comparable nearby UEs on a same or different service provider and on a same or different radio access technology.

In some embodiments, the UGI comprises information aggregated from a plurality of UEs or information specific to a single UE.

In some embodiments, generating network automation and optimization information based on at least some of the received UGI comprises generating network automation and optimization information based on information specific to a single UE.

In some embodiments, generating network automation and optimization information based on at least some of the received UGI comprises generating network automation and optimization information based on information aggregated from a plurality of UEs.

In some embodiments, generating network automation and optimization information based on at least some of the received UGI comprises generating network automation and optimization information based on information aggregated from an identified subset of the plurality of UEs.

In some embodiments, the network automation and optimization information comprises information used by the RAN for handover decisions or performance decisions associated with single UE or a plurality of UEs.

In some embodiments, the handover decisions comprise decisions involving handover to another service cell having the same RAT or handover to a different RAT.

In some embodiments, the performance decisions comprise decisions affecting the performance of the serving cell and/or neighboring cells.

In some embodiments, the information used by the RAN for handover within the same RAT for another serving cell, or for a different 3GPP/Non-3GPP and performance improvement decisions within the same serving cell and/or neighbors cells comprises information related to at least one of: selecting a target cell for handover or deciding to remain in the same serving cell for more time; selecting a 3GPP or non-3GPP RAT; allocating a registration area; optimizing paging; selecting a tracking area; triggering a handover; selecting a network slice; optimizing a RAT parameter or feature to maximize performance or reduce operating costs; activating or deactivating a parameter or feature to maximize performance or reduce operating costs; and activating or deactivating a network resource to maximize performance or reduce operating costs.

In some embodiments, the RAN comprises a NO-RAN.

According to another aspect of the present disclosure, a method for an online services application or AF to provide UGI to support network automation and optimization comprises, at a UE: generating the UGI; and sending the UGI to the online services AF or to a NWDA function via a UPF.

In some embodiments, the UGI is generated by an online services application within or connected to the UE.

In some embodiments, generating the UGI comprises generating at least one of: information identifying a reporting UE; location, positioning, or sensor information; network coverage information; signal quality information; information identifying a network connection; device specific information; and information related to nearby devices.

In some embodiments, the information identifying the reporting UE comprises at least one of: a MAC address; an IMSI; IMEI; and a MSISDN.

In some embodiments, the location, positioning, or sensor information comprises at least one of: a light/brightness level of the reporting UE; a noisy/sounds level around of the reporting UE; infrared/motion level around of the reporting UE; a heat/temperature level of the reporting UE; an air humidity level of the reporting UE; a latitude and longitude of the reporting UE; an altitude of the reporting UE; and a speed of movement of the reporting UE.

In some embodiments, the network coverage information comprises at least one of: information relating to a lack of coverage by any network technology supported by the reporting UE; information relating to a lack of 3GPP coverage but a presence of non-3GPP coverage by the reporting UE; an indication of a type of the non-3GPP coverage detected by the reporting UE; and an indication of a change of mobile network technologies by the reporting UE.

In some embodiments, the signal quality information comprises information relating to at least one of: a signal strength; a SINR; a quality of an air interface; average user latency; average jitter; average packet loss; average ping time; average TOA of a first packet; channel bandwidth capability; average user throughput; and actual user throughput of most used applications and services; of any network technology supported by the reporting UE.

In some embodiments, the information identifying the network connection comprises at least one of: a RAT; a PLMN ID; a list of Cell IDs of cells detected by the reporting UE; a list of carriers of each Cell ID of the cells detected by the reporting UE; a list of Non-3GPP network identifiers; and a list of WiFi SSIDs.

In some embodiments, the device specific information comprises information specific to the reporting UE.

In some embodiments, the information specific to the reporting UE comprises at least one of: a preferred network node of the reporting UE; a RAT supported by the reporting UE; an indication that WiFi was enabled or disabled on the reporting UE; a model number of the reporting UE; a serial number of the reporting UE; a device identifier of the reporting UE; a device type of the reporting UE; a date and/or time that the reporting UE reported the information; an operating system version of the reporting UE; a battery level of the reporting UE; an identity for advertisers of the reporting UE; a Google Play Service ID of the reporting UE; a time of service of the reporting UE; and an application version code of the reporting UE.

In some embodiments, the information related to nearby devices comprises KPIs of comparable nearby UEs on a same or different service provider and on a same or different radio access technology.

According to another aspect of the present disclosure, a network node for performing a method for an online services application or AF to provide UGI to support network automation and optimization comprises one or more modules operable to perform any of the methods described herein.

According to another aspect of the present disclosure, a network node for performing a method for an online services application or AF to provide UGI to support network automation and optimization is adapted to perform any of the methods described herein.

In some embodiments, the network node comprises a UE operable to perform any of the UE methods described herein.

In some embodiments, the network node comprises a NWDA function operable to perform any of the NWDA methods described herein.

In some embodiments, the network node comprises an online services AF operable to perform any of the AF methods described herein.

In some embodiments, the network node comprises an AMF operable to perform any of the AMF methods described herein.

In some embodiments, the network node comprises a RAN operable to perform any of the RAN methods described herein.

In some embodiments, the network node comprises an O&M node operable to perform any of the O&M methods described herein.

In some embodiments, the network node comprises a UPF operable to perform any of the UPF methods described herein.

According to another aspect of the present disclosure, a method for an online services AF to provide UGI to support network automation and optimization comprises, at the online services AF: collecting, from at least one UE, the UGI; and sending, to a NWDA, the collected UGI.

In some embodiments, the online services AF comprises a trusted AF within the domain of the network operator.

In some embodiments, the online services AF is network function that communicates with other network functions within the domain of the network operator via a service bus.

In some embodiments, sending the collected UGI to the NWDA comprises sending the collected UGI to the NWDA via a NEF.

In some embodiments, the online services AF comprises an untrusted AF that is not within the domain of the network operator.

In some embodiments, sending the collected UGI to the NWDA comprises sending the UGI to the NWDA using a RESTful API.

In some embodiments, the UGI comprises at least one of: information identifying a reporting UE; location, positioning, or sensor information; network coverage information; signal quality information; information identifying a network connection; device specific information; and information related to nearby devices.

In some embodiments, the information identifying the reporting UE comprises at least one of: a MAC address; an IMSI; an IMEI; and a MSISDN.

In some embodiments, the location, positioning, or sensor information comprises at least one of: a light/brightness level of the reporting UE; a noisy/sounds level around of the reporting UE; an infrared/motion level around of the reporting UE; a heat/temperature level of the reporting UE; an air humidity level of the reporting UE; a latitude and longitude of the reporting UE; an altitude of the reporting UE; and a speed of movement of the reporting UE.

In some embodiments, the network coverage information comprises at least one of: information relating to a lack of coverage by any network technology supported by the reporting UE; information relating to a lack of 3GPP coverage but a presence of non-3GPP coverage by the reporting UE; an indication of a type of the non-3GPP coverage detected by the reporting UE; and an indication of a change of mobile network technologies by the reporting UE.

In some embodiments, the signal quality information comprises information relating to at least one of: signal strength; a SINR; a quality of an air interface; average user latency; average jitter; average packet loss; average ping time; average Time Of Arrival (TOA) of a first packet; channel bandwidth capability; average user throughput; and actual user throughput of most used applications and services; of any network technology supported by the reporting UE.

In some embodiments, the information identifying the network connection comprises at least one of: a RAT; a PLMN ID; a list of Cell IDs of cells detected by the reporting UE; a list of carriers of each Cell ID of the cells detected by the reporting UE; a list of Non-3GPP network identifiers; and a list of WiFi SSIDs.

In some embodiments, the device specific information comprises information specific to the reporting UE.

In some embodiments, the information specific to the reporting UE comprises at least one of: a preferred network node of the reporting UE; a RAT supported by the reporting UE; an indication that WiFi was enabled or disabled on the reporting UE; a model number of the reporting UE; a serial number of the reporting UE; a device identifier of the reporting UE; a device type of the reporting UE; a date and/or time that the reporting UE reported the information; an operating system version of the reporting UE; a battery level of the reporting UE; an identity for advertisers of the reporting UE; a Google Play Service ID of the reporting UE; a time of service of the reporting UE; and an application version code of the reporting UE.

In some embodiments, the information related to nearby devices comprises KPIs of comparable nearby UEs on a same or different service provider and on a same or different radio access technology.

According to another aspect of the present disclosure, a method for an online services application or AF to provide UGI to support network automation and optimization comprises, at an AMF: receiving, from a NWDA, network automation and optimization information; and sending the network automation and optimization information to a RAN.

In some embodiments, the network automation and optimization information comprises mobility management and optimization information.

In some embodiments, receiving the network automation and optimization information from the NWDA comprises receiving the network automation and optimization information from the NWDA via a NSSF.

In some embodiments, the network automation and optimization information comprises NSSAI.

In some embodiments, the RAN comprises a NG-RAN.

According to another aspect of the present disclosure, a method for an online services application or AF to provide UGI to support network automation and optimization comprises, at a RAN: receiving, from a NWDA, network automation and optimization information; and performing a network automation or optimization function based on the received network automation and optimization information.

In some embodiments, receiving the network automation and optimization information from the NWDA comprises receiving the network automation and optimization information from the NWDA via an AMF.

In some embodiments, the network automation and optimization information comprises at least one of: mobility management and optimization information; and NSSAI.

In some embodiments, receiving the network automation and optimization information from the NWDA comprises receiving the network automation and optimization information directly from the NWDA.

In some embodiments, receiving the network automation and optimization information from the NWDA comprises receiving the network automation and optimization information from the NWDA via an O&M node.

In some embodiments, the network automation and optimization information comprises a handover request.

In some embodiments, the handover request comprises at least one of: a RAT RFSP index; a SPID; a 5QI; a QCI; a TMSI range; and AMF CN assistance information.

In some embodiments, the RAN is a NG-RAN.

According to another aspect of the present disclosure, a method for an online services application or AF to provide UGI to support network automation and optimization comprises, at an O&M node: receiving, from a NWDA, network automation and optimization information; and sending, to a RAN, the received network automation and optimization information.

In some embodiments, the network automation and optimization information comprises a handover request.

In some embodiments, the handover request comprises at least one of: a RAT RFSP index; a SPID; a 5QI; a QCI; a 5G TMSI, range; and AMF CN, assistance information.

In some embodiments, the RAN is a NG-RAN.

According to another aspect of the present disclosure, a method for an online services application or AF to provide UGI to support network automation and optimization comprises, at a UPF for providing a User Plane connection between UEs and AFs within a domain of a network operator: receiving, from a UE, UGI collected by an online services application within or connected to the UE; and sending the UGI to a NWDA.

In some embodiments, sending the UGI to the NWDA comprises sending the UGI to the NWDA using a RESTful API.

According to another aspect of the present disclosure, a non-transitory computer readable medium stores software instructions that when executed by one or more processors of a network node for performing a method for an online services application or AF to provide UGI to support network automation and optimization, cause the network node to perform any of the methods described herein.

According to another aspect of the present disclosure, a computer program comprises instructions which, when executed by at least one processor of a network node, cause the at least one processor to perform any of the methods described herein.

According to another aspect of the present disclosure, a carrier comprises the computer program above, wherein the carrier is one of an electronic signal, an optical signal, a radio signal, or a computer readable storage medium.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
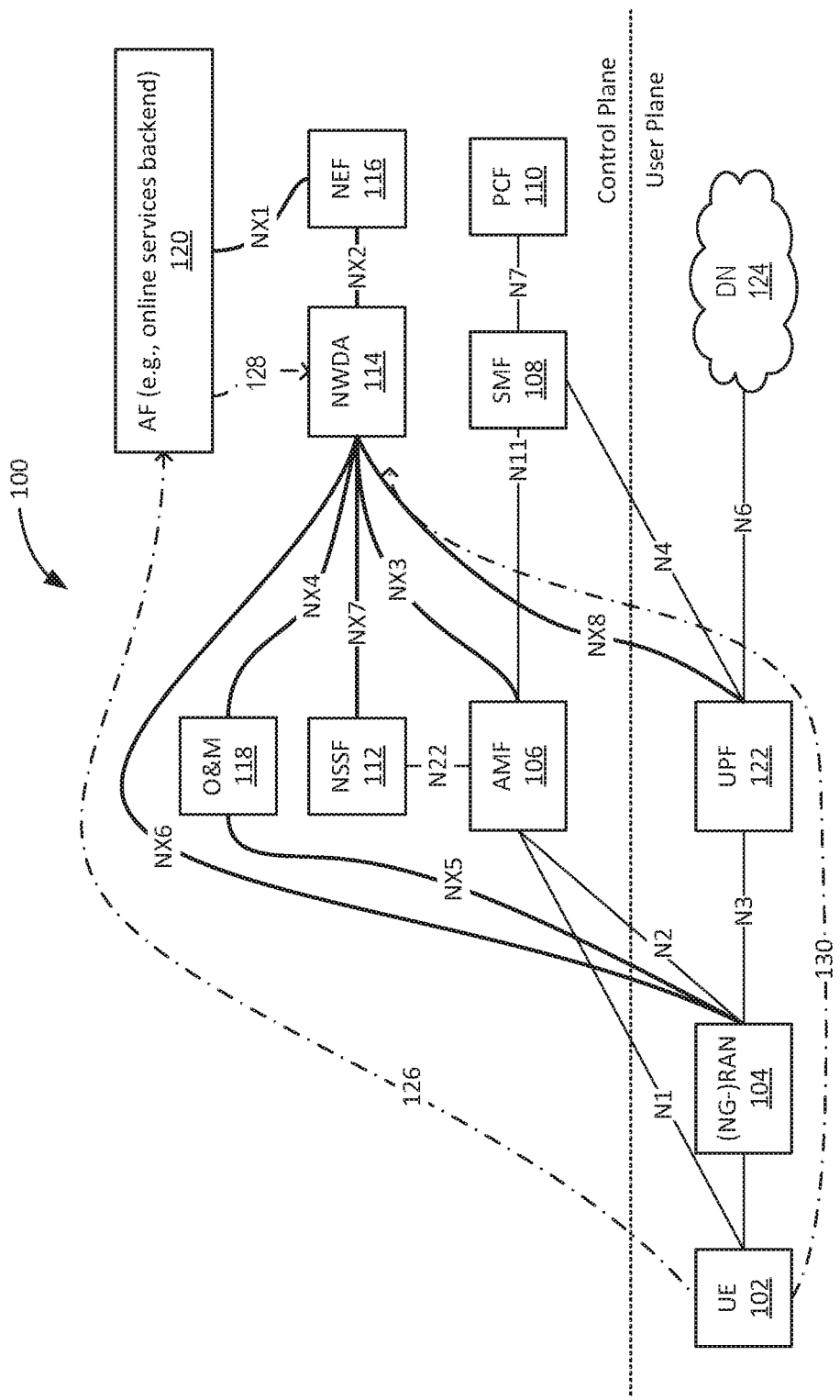
FIG. 1 illustrates a wireless communication system represented as a Fifth Generation (5G) network architecture composed of core Network Functions (NFs), where interaction between any two NFs is represented by a point-to-point reference point/interface.

FIG. 1 illustrates a wireless communication system 100 represented as a 5G network architecture composed of core Network Functions (NFs), where interaction between any two NFs is represented by a point-to-point reference point/interface.

Seen from the access side the 5G network architecture shown in FIG. 1 comprises a plurality of UEs 102 connected to either a Radio Access Network (RAN) or an Access Network (AN). A node that may be either a RAN or an AN may be referred to as a "(R)AN" 104 and labeled as such in a Figure. For brevity, hereinafter, the term "RAN" will be understood to refer to either a RAN or an AN unless otherwise specified as being exclusively referring to a RAN. Typically, a RAN 104 comprises base stations, e.g., eNBs, gNBs, or similar. Each UE 102 may also be connected to a Core Access and Mobility Management Function (AMF) 106. Seen from the core network side, the 5G core NFs shown in FIG. 1 include a Session Management Function (SMF) 108, a Policy Control Function (PCF) 110, and a Network Slice Selection Function (NSSF) 112. The network architecture illustrated in FIG. 1 also includes a Network Data Analytics (NWDA) 114, a Network Exposure Function (NEF) 116, an Operations and Management (O&M) node 118, and one or more AFs 120. In the embodiment illustrated in FIG. 1, the AF 120 is an online services backend, or Application Function Backend (AFBE). A User Plane Function (UPF) 122 provides a connection from the RAN 104 to a Data Network (DN) 124.

Reference point representations of the 5G network architecture are used to develop detailed call flows in the normative standardization. The 5G reference points are named N1, N2, and so on. N1 is defined to carry signaling between the UE 102 and AMF 106. N2 connects the RAN 104 and the AMF 106, N3 connects the RAN 104 and the UPF 122, and N4 connects the UPF 122 and the SMF 108. N6 connects the UPF 122 and the DN 124. There is a reference point, N11, between the AMF 106 and SMF 108, which implies that the SMF 108 is at least partly controlled by the AMF 106. N7 is the reference point between the SMF 108 and the PCF 110. N22 is the reference point between the AMF 106 and the NSSF 112.

The 5G core network aims at separating user plane and control plane. The user plane carries user traffic while the control plane carries signaling in the network. In FIG. 1, the UPF 122 is in the user plane and all other NFs, i.e., the AMF 106, SMF 108, PCF 110, NSSF 112, NWDA 114, NEF 116, and O&M 118 are in the control plane. Separating the user and control planes guarantees each plane resource to be scaled independently. It also allows the UPFs 122 to be deployed separately from control plane functions in a distributed fashion. In this architecture, UPFs 122 may be deployed very close to UEs 102 to shorten the Round Trip Time (RH) between UEs 102 and data network for some applications requiring low latency.

The core 5G network architecture is composed of modularized functions. For example, the AMF 106 and SMF 108 are independent functions in the control plane. Separated AMF 106 and SMF 108 allow independent evolution and scaling. Other control plane functions, such as PCF 110 and NWDA 114, can be separated as shown in FIG. 1. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

As described above (and detailed in 3GPP Technical Report (TR) 23.791), there is currently no mechanism for a network operator to get information that might be useful for network automation or performance optimization from AFs, especially from online services backends like AF (120) in FIG. 1. As a result, it is difficult for network operators to measure the actual service experience of the users and also don't know how to optimize the service, e.g., by improving network automation or performance. Another issue is that different service applications usually have different service requirements and probably could change their service frequently since an online services provider's behavior may often change based on its own requirements. Furthermore, it is unclear which data type is related to a particular performance objective when data is being collected for data analytics by a NWDA 114. Some parameters, such as communication pattern and background traffic policy, have already been defined in TS 23.682 for 4G network and could be useful to the NWDA 114.

In conventional 5G networks, certain network elements, such as Remote Radio Units (RRUs), Baseband Units (BBUs), AMFs 106 and NWDAs 114, collect Quality of Service (QoS), Quality of Experience (QoE), or other end user performance indicators that support network automation, such as mobility trajectory information and optimization. Similarly, for all previous cellular technologies, including LTE, 3G, and 2G, these network elements typically generate inputs to the analytics nodes, such as the O&M 118 and the NWDA 114, via counters, logs, traces, probes. The situation started to change, however, when the introduction of the SCEF in LIE. A SCEF can expose certain network capabilities to AFs.

This trend continued in 5G, which standardized the NEF 116 and the NWDA 114. TR 23.791 section 5.1.1.1 states in particular that there is a need to (a) define a framework for data retrieval from AF(s) 120, and (b) define common data that could be retrieved across multiple applications, but does not describe a solution for either of those two needs. TR 23.791 section 5.1.4 identifies the NWDA 114 as a logical choice of entity to collect and analyze UE mobility behaviors, which may be used to customize mobility management on a per-UE basis, but leaves open the question of how the NWDA 114 gets the information, what the NWDA 114 does with the information, and who will be the recipient of the analytical results provided by the NWDA 114.

In short, there is currently no standardized mechanism by which trusted or untrusted AFs 120 can provide information to an NWDA 114 and consequently there is a lack of definition on how the NWDA 114 may use such information to affect the network functions in charge of network automation and optimization.

This is an important problem to solve, given the wealth of information that may be provided by AFs in general and by online services AFBEs in particular, which could be used to inform network automation and optimization processes and thus improve the end user experience. For example, some online services providers capture enough data to know when certain cells are offering better customer experience, e.g., because they are offload, because they have better bandwidth/backhaul, because they are associated with better user plane, and so on. The subject matter of the present disclosure addresses these needs.

The present disclosure provides a mechanism by which online services providers/AFBEs can influence network automation and mobility management/optimization. According to one aspect, an AF 120 could provide information that could allow 5G nodes like the AMF 106, UDM, or NWDA 114, or 4G nodes like the MME, Home Subscriber Server (HSS), and O&M, to have an influence on the Tracking Area Indicator (TAI). This influence could, for example, accelerate handover and/or ensure the next handover would be to a better cell that improves end user experience.

Because online service providers typically have information about more than one network or network type, information about non-3GPP networks or other Radio Access Technologies (RATs) may also be considered, e.g., to inform Local Breakout (LBO) and other traffic redirection decisions. Positioning information provided by an AFBE could be used to correlate Global Positioning System (GPS) data with Cell ID or Mobile Network Operator (MNO) information within the NWDA.

The present disclosure provides a method for online service providers to contribute to the network automation and optimization processes by providing data collected from UEs 102 to the NWDA 114. In the embodiment illustrated in FIG. 1, new reference points (which may also be referred to as interfaces), representing communications between particular NFs, are defined for this purpose. These new interfaces are:

NX1—between an AF 120 and a NEF 116;
NX2—between a NEF 116 and an NWDA 114;
NX3—between an NWDA 114 and an AMF 106;

NX4—between an NWDA 114 and an O&M 118;
NX5—between an O&M 118 and a RAN 104;
NX6—between an NWDA 114 and a RAN 104;
NX7—between an NWDA 114 and an NSSF 112; and
NX8—between an NWDA 114 and a UPF 122.

In the embodiment illustrated in FIG. 1, the information collected by UEs 102, herein referred to as UE-Generated Information (UGI), may be transferred to the NWDA 114 in two different ways.

In a first way, an online service application within the UE 102 (e.g., an application running on the UE 102) or connected to the UE 102 (e.g., running in a device that is connected to the UE 102 via a wired or wireless connection) collects and caches information. When connectivity to the online services backend, AF 120, is available—either via the serving cellular network or via another network type, such as WiFi—the UE 102 will transfer its cached UGI to the AF 120. This is shown as dotted path 126 in FIG. 1. The AF 120 will then transfer the UGI to the NWDA 114, e.g., via NX1 to the NEF 116 and then via NX2 from the NEF 116 to the NWDA 114. This is shown as dotted path 128 in FIG. 1.

In a second way, the online service application within or connected to the UE 102 collects and caches information. When connectivity to the serving cellular network is available, the UE 102 will transfer its cached UGI to the NWDA 114 via the UPF 122, bypassing the AF 120. This is shown in FIG. 1 as dotted path 130. Both scenarios are described in more detail in FIG. 2.

Collecting the UGI

UGI collected by online service providers and potentially valuable for making network automation and optimization decisions may include, but is not limited to: information identifying the reporting UE; UE sensor information; network coverage information; signal quality information; information identifying a network connection; device specific information; and information related to nearby devices.

Information identifying the reporting UE may include, but is not limited to: a Media Access Control (MAC) address; an International Mobile Subscriber Identity (IMSI); an International Mobile Equipment Identity (IMEI); and a Mobile Station International Subscriber Directory Number (MSISDN).

Location, positioning, or sensor information may include, but is not limited to: a light/brightness level of the reporting UE; a noisy/sounds level around of the reporting UE; an infrared/motion level around of the reporting UE; a heat/temperature level of the reporting UE; an air humidity level of the reporting UE; a latitude and longitude of the reporting UE; an altitude of the reporting UE; and a speed of movement of the reporting UE.

Network coverage information may include, but is not limited to: information relating to a lack of coverage by any network technology supported by the reporting UE; information relating to a lack of 3GPP network coverage but a presence of non-3GPP network coverage by the reporting UE; an indication of a type of the non-3GPP coverage detected by the reporting UE; and an indication of a change of mobile network technologies by the reporting UE. Examples of 3GPP networks include, but are not limited to, Second Generation (2G), 3G, LIE, LIE Advanced (LTE-A), LIE for MIC (LTE-M), 5G NR (5G-NR), and Narrowband Internet of Things (NB-IoT). Example of non-3GPP networks include, but are not limited to, WiFi, Long Range (LoRa) radio, SigFox, and any type of low power type of wireless communication.

Signal quality information may include, but is not limited to, information relating to, for any network technology supported by the reporting UE: a signal strength; a Signal and Interference to Noise Ratio (SINR); a quality of an air interface; average user latency; average jitter; average packet loss; average ping time; average Time Of Arrival (TOA) of a first packet; channel bandwidth capability; average user throughput; and actual user throughput of most-used applications and services.

Information identifying the network connection may include, but is not limited to, at least one of: a Radio Access Technology (RAT); a Public Land Mobile Network (PLMN) Identifier (ID); a list of Cell Identifiers (Cell Ds) of cells detected by the reporting UE; and a list of carriers of each Cell ID of the cells detected by the reporting UE; a list of Non-3GPP network identifiers; and a list of WiFi Service Set Identifiers (SSIDs).

Device specific information may include information specific to the reporting UE, such as, but is not limited to: a preferred network node of the reporting UE; a Radio Access Technology (RAT) supported by the reporting UE; an indication that WiFi was enabled or disabled on the reporting UE; a model number of the reporting UE; a serial number of the reporting UE; a device identifier of the reporting UE; a device type of the reporting UE; a date and/or time that the reporting UE reported the information; an operating system version of the reporting UE; a battery level of the reporting UE; an identity for advertisers of the reporting UE; a Google Play Service ID of the reporting UE; a time of service of the reporting UE; and an application version code of the reporting UE.

Information related to nearby devices may include, but is not limited to, Key Performance Indicators (KPIs) of comparable nearby UEs on a same or different service provider and on a same or different radio access technology.

All of the above-listed information may be collected separately or in combination. For example, an online services application running on a UE 102 may collect latitude and longitude data whether it is connected to a mobile network, connected to an unlicensed (e.g., WiFi) network, or not connected to any network. Thus, the UE 102 may collect information indicating whether a particular geographical location does or does not have a network connection. Equally valuable, the UE 102 may collect information indicating what network technologies (e.g., 2G, 3G, LIE, 5G-NR, WiFi, LAA, and others) are available or not available at a particular geographical location. The information collected may show whether the network type changed, especially during an upload or download, including any other switch between mobile technologies (or a double switch, e.g., 2G to 3G to 4G).

In this manner, information about lack of coverage may be determined explicitly (e.g., the online services provider reports that all UEs lose contact with the AF backend server when the UE is in this particular location) rather than implicitly (e.g., there is no information related to this particular location probably there is no coverage there). Latitude and longitude, time of day, battery level, type of mobile phone, etc., and other meta-data may be included in or associated with any of the other types of information.

All of the data listed above, and more, may be considered KPIs.

Figure 2:
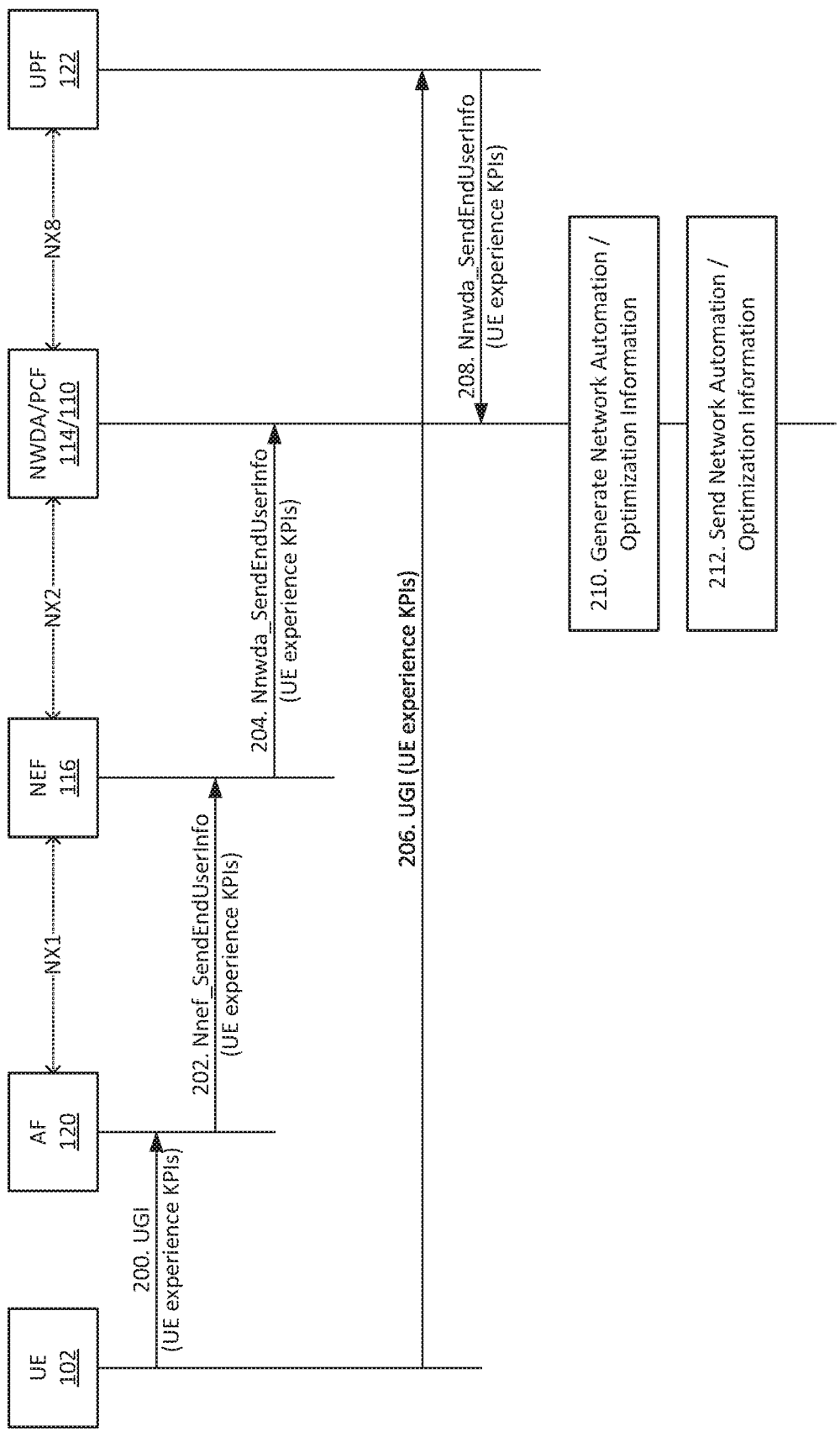
FIG. 2 illustrates a first portion of an exemplary process for an online services application or Application Function (AF) to provide User Equipment (UE)-Generated Information (UGI) to support network automation and optimization according to some embodiments of the present disclosure.

FIG. 2 illustrates a first portion of an exemplary process for an online services application (on the UE) or online services AF (in the network) to provide UGI to support network automation and/or optimization according to some embodiments of the present disclosure. FIG. 2 illustrates various ways that UGI may be provided to the NWDA 114. (Later figures illustrate various ways that the information collected by the NWDA 114 may be used to inform network automation/optimization of the network 100.) Referring now to FIG. 2:

In one scenario, at step 200, the UE 102 provides GUI to the AF 120. At step 202, the AF 120 transfers UGI to the NEF 116, e.g., via NX1. In the embodiment illustrated in FIG. 2, the UGI comprises UE experience KPIs, which the AF 120 sends via an Nnef_SendEndUserInfo message. At step 204, the NEF 116 transfers the UGI to the NWDA 114, e.g., via NX2. In the embodiment illustrated in FIG. 2, the NEF 116 sends the UGI via an Nnwda_SendEndUserInfo message.

In an alternative scenario, the UE 102 bypasses the AF 120. In the embodiment illustrated in FIG. 2, the UE 102 sends UGI to the NWDA 114 via the UPF 122, shown as steps 206 and 208. In this scenario, the UPF 122 operates like a router from the UE 102 to the PLMN and thus to the NWDA 114. In some embodiments, the UE 102 has access to an API that allows communications with the NWDA 114; from the perspective of the UE 102, it is directly communicating with the NWDA 114, but from the network perspective the UPF 122 is involved, which may be transparent to the UE 102.

In some embodiments, the NWDA 114 interacts with the PCF 110, e.g., to check whether or not to accept the incoming information. In the embodiment illustrated in FIG. 2, a PCF 110 is placed with or part of the NWDA 114. In alternative embodiments, the PCF 110 may be separate from the NWDA 114. In other alternative embodiments, the NWDA 114 may opt not to query the PCF 110 regarding these matters. In yet other alternative embodiments, the PCF may be placed with the NEF 116, in which case when the NEF 116 receives a request from an untrusted or third party AF backend, the NEF 116 can query the PCF 110 to check whether that particular AF backend and/or that particular UE data can be accepted by the NWDA 114.

At step 210, the NWDA 114 and/or PCF 110 generates network automation/optimization information. This step may include processing data from a single UE or from multiple UEs. Processing data may include, but is not limited to, storing the data, merging the data with other data, manipulating the data, using the data to generate a report, using the data to identify a policy to be applied, and so on. In some embodiments, step 210 is optional, meaning that in some circumstances the NWDA 114 may receive UGI but merely store it without triggering analysis and/or generation of network automation/optimization information.

At step 212, the NWDA 114 sends network automation/optimization information. As will be shown in more detail in FIGS. 3-5 below, this information is sent in one of various different paths that ultimately end at the RAN 104. In some embodiments, step 212 is optional, meaning that in some circumstances the NWDA 114 may generate the network automation/optimization information but not send it until later, e.g., upon detection of a trigger condition.

Using the UGI

The information collected by the NWDA may be used in a number of ways, including, but not limited to, network automation and network optimization. Specifically, the availability of UGI will allow the network functions (e.g., the RAN 104 and the AMF 106) to make the next action decision based on improving the end user network experience.

Figure 3:
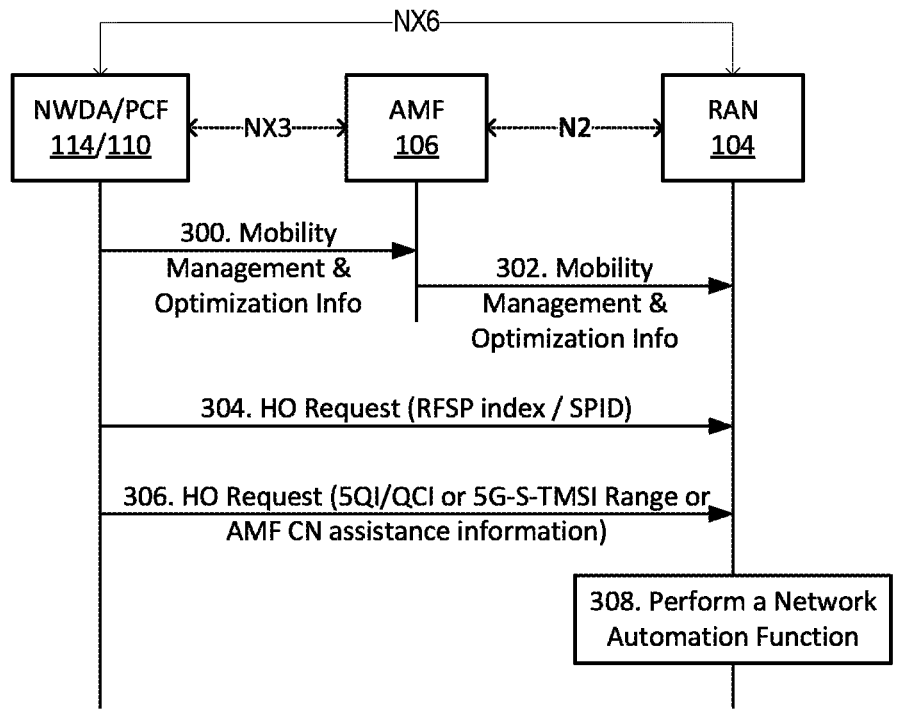
FIGS. 3-5 illustrate a second portion of an exemplary process for an online services AF to provide UGI to support network automation according to some embodiments of the present disclosure.
Figure 4:
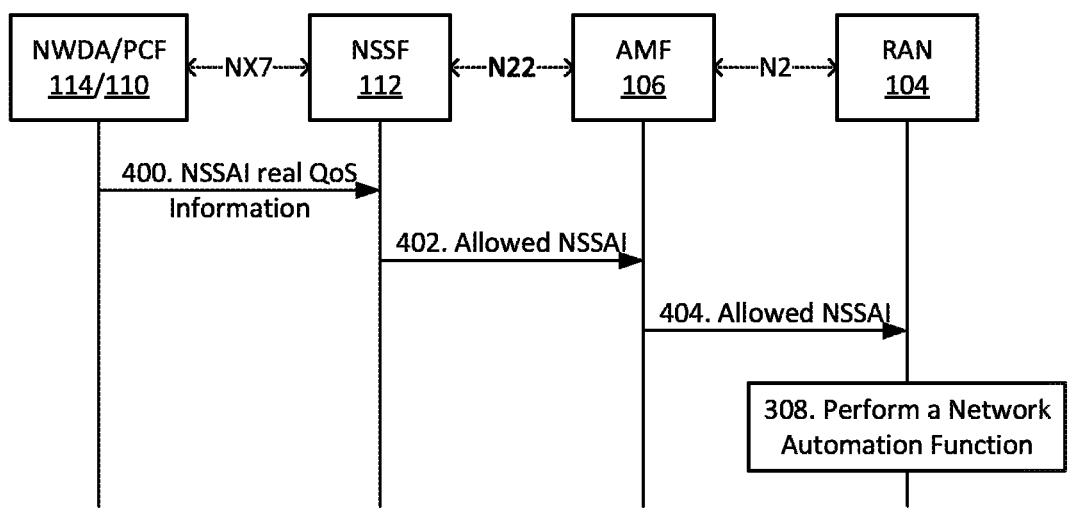
Figure 5:
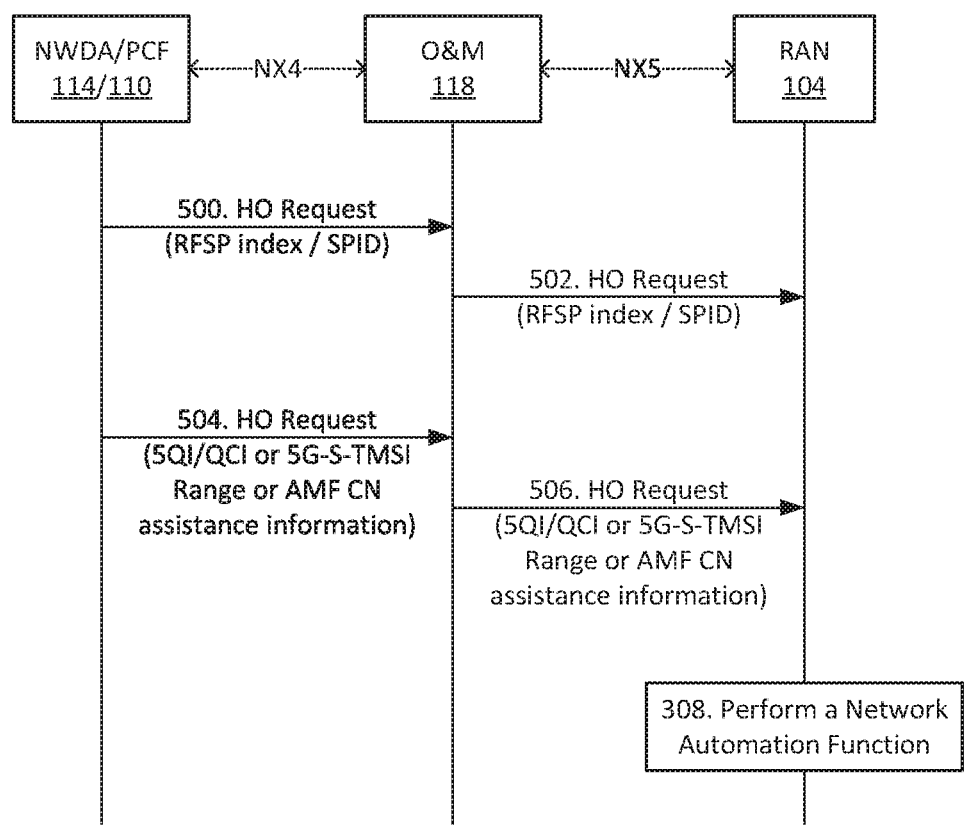

FIGS. 3-5 illustrate a second portion of an exemplary process for an online services application or AF to provide UGI to support network automation and optimization according to some embodiments of the present disclosure. These figures illustrate various actions that the NWDA 114 may take as part of a network automation or optimization process, and the various paths along which this influence may travel within the network 100. In each example, the NWDA 114 ultimately influences the RAN 104, but using different sets of network functions.

FIG. 3 illustrates a second portion of an exemplary process for an online services AF to provide UGI to support network automation according to some embodiments of the present disclosure. FIG. 3 illustrates two different approaches that may be taken by the NWDA 114—namely, by signaling through the AMF 106 to get to the RAN 104, or by signaling the RAN 104 directly.

In an example of the first approach, at step 300, the NWDA 114 sends mobility management and optimization information to the AMF 106, e.g., via new interface NX3, and at step 302, the AMF 106 forwards this information to the RAN 104, e.g., via existing 3GPP interface N2. This information may include parameters that can be used for allocating registration area, for optimizing paging handling, or for adjusting a mobility restriction area, e.g., a Tracking Area Indicator (TAI).

In an example of the second approach, at step 304, the NWDA 114 sends to the RAN 104 a handover request that includes a RAT Frequency Selection Priority (RFSP) index and/or a Subscriber Profile Identifier (SPID), e.g., via new interface NX6. Alternatively, at step 306, the NWDA 114 sends to the RAN 104 a handover request that includes a 5G QoS Indicator (5QI), a QoS Class Indicator (QCI), a 5G Temporary Mobile Subscriber Identity (TMSI) range, and/or an AMF Core Network (CN) assistance information parameter, e.g., via new interface NX6.

At optional step 308, the RAN 104 may perform a network automation or optimization function, such as, but not limited to, making a decision whether or not to request a handover, and if so, issuing a handover request.

FIG. 4 illustrates a second portion of an exemplary process for an online services AF to provide UGI to support network automation according to other embodiments of the present disclosure. In the embodiment illustrated in FIG. 4, the NWDA 114 communicates with the RAN 104 using a path that includes the NSSF 112 and the AMF 106.

At step 400, the NWDA 114 sends to the NSSF 112 a message that contains Network Slice Selection Assistance Information (NSSAI) real QoS information, e.g., via new interface NX7. The NSSF 112 uses this information to make a network slice allocation, e.g., to change a user plane or RAN based on the network slice requirements and UGI collected by the NWDA 114 from online service provider applications or AFs as illustrated in FIG. 2.

At step 402, the NSSF 112 sends to the AMF 106 a list of one or more allowed NSSAIs, which the AMF 106 forwards to the RAN 104 in step 404. Upon receiving this information, the RAN 104 may optionally perform a network automation or optimization function as described in step 308 in FIG. 3. In this manner, UGI may be used to support the NSSF 112 in making the best decision related to network slice requests. Alternatively, a UE 102 application may communicate with a PLMN backend that communicates with the NWDA 114.

FIG. 5 illustrates a second portion of an exemplary process for an online services AF to provide UGI to support network automation according to yet another embodiment of the present disclosure. In the embodiment illustrated in FIG. 5, the NWDA 114 communicates with the RAN 104 using a path that includes the O&M 118, e.g., via new interface NX4 from the NWDA 114 to the O&M 118 and via new interface NX5 from the O&M 118 to the RAN 104. The embodiment illustrated in FIG. 5 may be used to implement handover requests for multiple UEs, the set of which may be identified in various ways.

In a first way, at step 500, the NWDA 114 issues a handover request that identifies a set of one or more UEs based on a RFSP and a SPID, and at step 502, the O&M 118 forwards that handover request to the RAN 104. In this approach, during N2 setup the AMF 106 indicate which RFSP/SPID to which the UE 102 belongs. The RAN 104 gets from the O&M 118 how the RFSP/SPID should be treated to support the mobility trajectory.

In a second way, at step 504, the NWDA 114 issues a handover request that contains a 5QI, a QCI, a 5G TMSI range, and/or an AMF CN assistance information parameter, and at step 506, the O&M 118 forwards that handover request to the RAN 104. In this approach, a set of one or more UEs may be identified based on a 5QI or QCI value or a TMSI range. The ON assistance information allows the AMF to add information such as treatment classes, e.g., so that certain subscribers get some specific treatment during handover. For example, certain subscribers may be triggered to handover to a better cell or RAT more easily (or less easily) than other subscribers.

It should be noted that none of the scenarios described above directly impact the Handover Required decision, but instead only influence the mobility trajectory and/or user plane allocation. The Handover Required decision would continue to reside on the serving RAN based on the signal measurement executed by the UE 102.

Example Use Cases

The capabilities described above make possible new triggers in the network automation process, e.g., new triggers or decision methods for handovers and/or network optimization procedures. For example, an available network, whether it be 2G, 3G, LTE, LTE-A, LTE-M, 5G-NR, WiFi, NB-IoT, LTE-M, etc., can dynamically adjust to attend to demands of native or external applications associated with UEs, Customer Premises Equipment (CPEs), or other client devices.

Conventionally, the network automation decision process to decide which RAT, PLMN, and/or cell should serve the UE 102 is mainly concerned with UE/RAT technology preference, UE/RAT compatibility, cell load, and signal strength, and the decision is made primarily from the perspective of the radio—i.e., by attempting to find a RAT that is supported by both UE 102 and RAN 104 and that has the best performance in terms of network KPIs and parameters.

One weakness of the conventional network automation decision process is that it does not consider other information typically possessed by online service providers. The methods and systems presented herein make such information available by defining mechanism by which a NWDA 114 (or other node) collects and processes information from both online service providers and from other nodes within the MNO, and uses this data, or information derived from analysis of this data, to inform the network automation and optimization processes.

For example, in a conventional network, a mobility management and optimization decision may select a next cell or RAT based on whichever cell or RAT has the best throughput, but it may be that a cell or RAT other than the one that was chosen would have better coverage, better latency, better ping times, better first packet time of arrival, and so on. In that scenario, even if there is a RAT, PLMN, or cell with higher signal strength, it may not be the best option if there is another RAT/PLMN/Cell with better coverage (which may be more reliable and better suited to critical use cases), better latency (which may be more suitable for remote control use cases), or better ping (which may be more suitable for notification use cases).

The methods and system of the present disclosure make these and other types of information available for inclusion in the network automation and optimization processes. This information can help the network to automate the mobility management and optimization decisions not only based in the best throughput, for example, but depending on the UE critical demand it could make the decision based on best coverage, best latency, best ping, best first packet time of arrival, etc.

This new method of network automation decision processes allows new dimensions to the decision process to define the serving RAT/PLMN/Cell. For example, there can now be historical and real time dynamic metrics defining the most appropriated cells. In most cases, changes to the network, such as changes to the transport hops on the End-To-End (E2E) communication, changes to the nodes involved on the communication, changes to Internet Protocol (IP) addresses, DNS nodes, routers, technologies, protocols, and Application Programming Interfaces (APIs), will not impair the capabilities described herein. The final customer experience can be taken into consideration in real time and any change on the network that can impact the customer experience can be taken in consideration dynamically and in real time.

In some embodiment, all UE info collected will also be taken into consideration, including, but not limited to: device model numbers, manufacturers, OS, battery level, etc.; applications being run on the device; and all services (e.g., video live, video streaming, real time conversation, driverless, etc.) provided to the device, to name a few examples.

Some examples of decisions that will be allowed using the methods and system described herein include, but are not limited to:
  forcing the UE 102 onto a low bandwidth cell that offers better coverage even if not the best throughput;
  forcing the UE 102 to fall back to an older RAT because it may offer better throughput in the case the latest technology is overloaded;
  forcing the UE 102 onto a low bandwidth cell that could require less signaling, and thus provide lower UE battery consumption and longer battery time;
  forcing the UE 102 onto a non-3GPP RAT as part of a network offload or local breakout strategy; and
  forcing multiple UEs 102 to be distributed across different RATs, PLMNs, and/or cells, based on the application or online service.

The methods and systems of the present disclosure provide feedback to 5G ON systems by sending end-user experience information and other UGI from an online services AF, such as AF 120, to the MNO NWDA 114 via the NEF 116. However, the same concepts may be applied to other technologies. For example, a LTE SCEF could feed an MNO's network analytics/O&M solution with information that could eventually support a better mobility management and optimization decision to improve network experience. While the NWDA 114 and the O&M 118 are inside the MNO's trusted domain, being accessible to third party AFs only via the NEF 116 or a SCEF, having user experience information provided by online services providers will be beneficial for future network planning, such as handover decisions, RAN density, spectrum utilization, etc. The UGI provided by online services providers is typically more accurate than information provided by network probes, traces, logs, and counters, and reduces the processing power required within network functions to collect these data (and may obviate the need for network functions to collect such data).

Moreover, some types of information that can be provided by online services providers is simply not available from network functions, such as: indications of lack of coverage, information about where the UE 102 prefers to connect via a non-3GPP RAT, information about where the UE 102 prefers to fall back into older technology, and so on. In some embodiments, these types of information are collected by the UEs 102, cached, and transferred to the NWDA 114 when the UE 102 is back to connected mode. The methods and systems disclosed herein provide a mechanism by which an online services provider can post information to the NWDA 114 or otherwise notify the NWDA 114 of lack of coverage or other conditions that the network itself is not able to detect or discern on its own.

In conventional networks, there is no mechanism for online service providers' applications and AFs to access the NWDA 114. In one embodiment of the present disclosure, this access is performed via the NEF 116, e.g., using the service-based architecture and a Representational State Transfer (REST)-ful API. In one embodiment, the NEF 116 is configured to support a new RESTful API, dedicated to allowing online service providers' applications and AFs 120 to access the NWDA 114.

OTHER EMBODIMENTS

Figure 6:
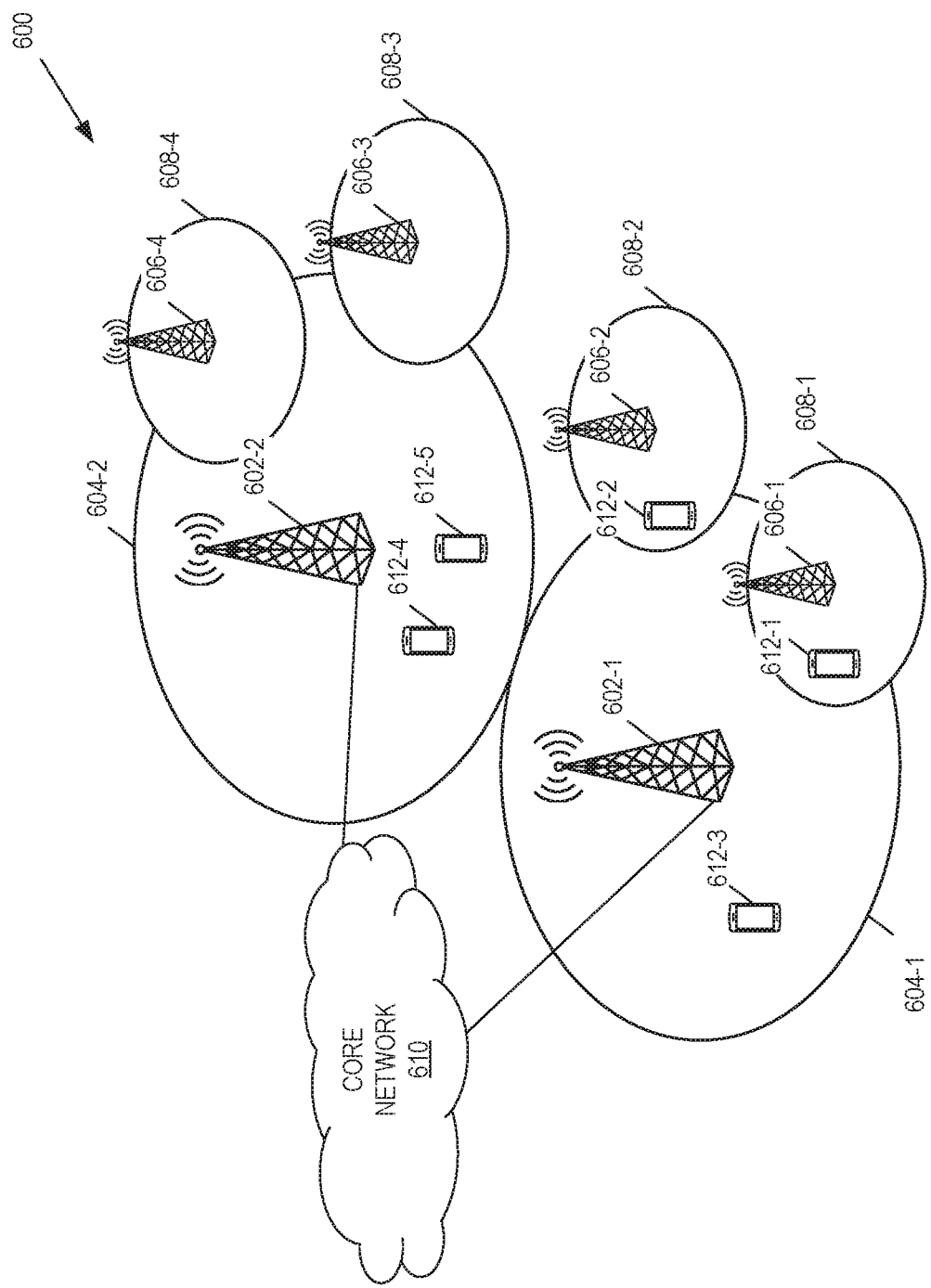
FIG. 6 illustrates one example of a cellular communications network according to some embodiments of the present disclosure.

FIG. 6 illustrates one example of a cellular communications network 600 according to some embodiments of the present disclosure. In the embodiments described herein, the cellular communications network 600 is a 5G NR network. In this example, the cellular communications network 600 includes base stations 602-1 and 602-2, which in LIE are referred to as eNBs and in 5G NR are referred to as gNBs, controlling corresponding macro cells 604-1 and 604-2. The base stations 602-1 and 602-2 are generally referred to herein collectively as base stations 602 and individually as base station 602. Likewise, the macro cells 604-1 and 604-2 are generally referred to herein collectively as macro cells 604 and individually as macro cell 604. The cellular communications network 600 also includes a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The base stations 602 (and optionally the low power nodes 606) are connected to a core network 610.

The base stations 602 and the low power nodes 606 provide service to wireless devices 612-1 through 612-5 in the corresponding cells 604 and 608. The wireless devices 612-1 through 612-5 are generally referred to herein collectively as wireless devices 612 and individually as wireless device 612. The wireless devices 612 are also sometimes referred to herein as UEs.

Figure 7:
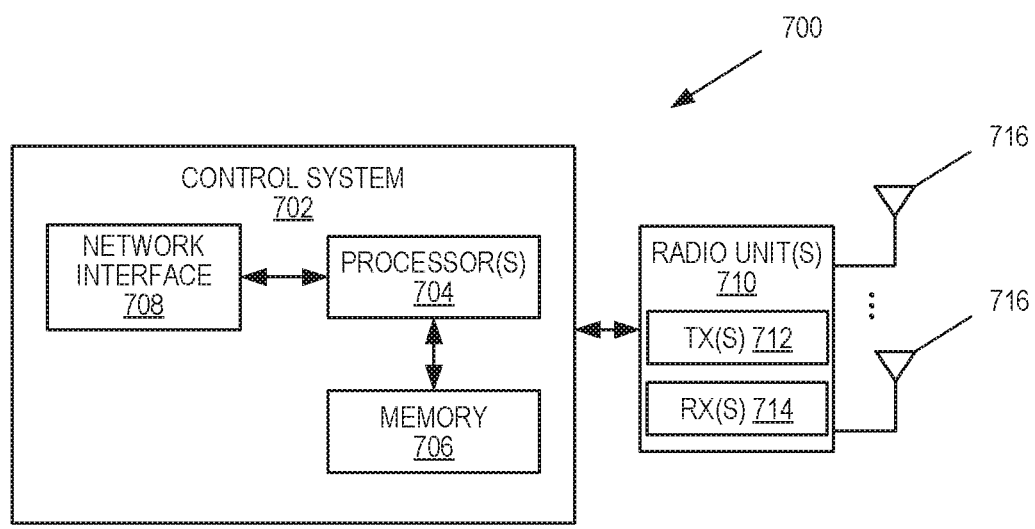
FIG. 7 is a schematic block diagram of a radio access node according to some embodiments of the present disclosure.

FIG. 7 is a schematic block diagram of a radio access node 700 according to some embodiments of the present disclosure. The radio access node 700 may be, for example, a base station 602 or 606. As illustrated, the radio access node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. In addition, the radio access node 700 includes one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a radio access node 700 as described herein. In some embodiments, the function(s) are implemented in software that is stored, e.g., in the memory 706 and executed by the one or more processors 704.

Figure 8:
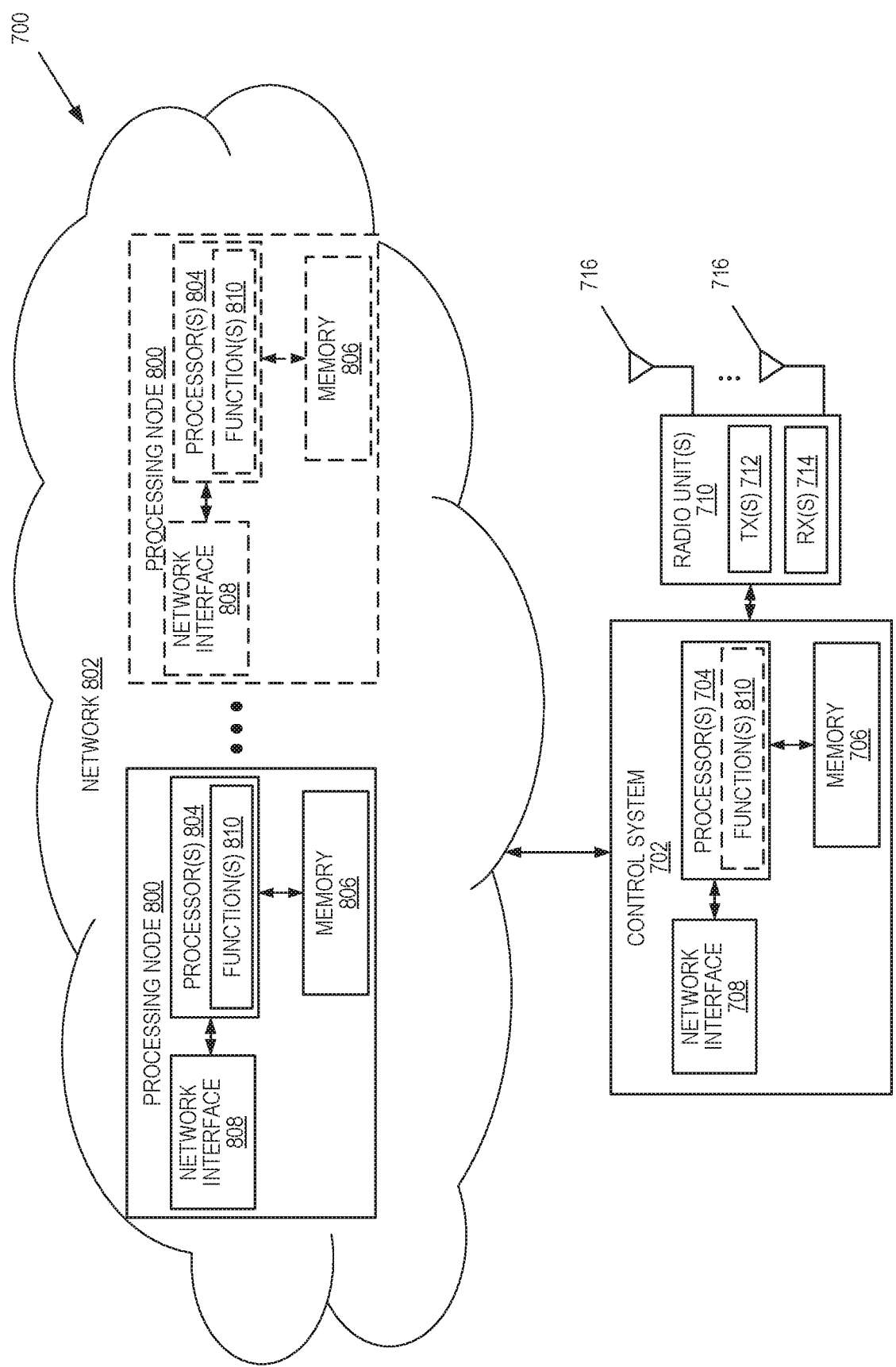
FIG. 8 is a schematic block diagram that illustrates a virtualized embodiment of the radio access node of FIG. 7 according to some embodiments of the present disclosure.

FIG. 8 is a schematic block diagram that illustrates a virtualized embodiment of the radio access node 700 according to some embodiments of the present disclosure. This discussion is equally applicable to other types of network nodes. Further, other types of network nodes may have similar virtualized architectures.

As used herein, a "virtualized" radio access node is an implementation of the radio access node 700 in which at least a portion of the functionality of the radio access node 700 is implemented as a virtual component(s) (e.g., via a virtual machine(s) executing on a physical processing node(s) in a network(s)). As illustrated, in this example, the radio access node 700 includes the control system 702 that includes the one or more processors 704 (e.g., CPUs, ASICs, FPGAs, and/or the like), the memory 706, and the network interface 708 and the one or more radio units 710 that each includes the one or more transmitters 712 and the one or more receivers 714 coupled to the one or more antennas 716, as described above. The control system 702 is connected to the radio unit(s) 710 via, for example, an optical cable or the like. The control system 702 is connected to one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808.

In this example, functions 810 of the radio access node 700 described herein are implemented at the one or more processing nodes 800 or distributed across the control system 702 and the one or more processing nodes 800 in any desired manner. In some particular embodiments, some or all of the functions 810 of the radio access node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of radio access node 700 or a node (e.g., a processing node 800) implementing one or more of the functions 810 of the radio access node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
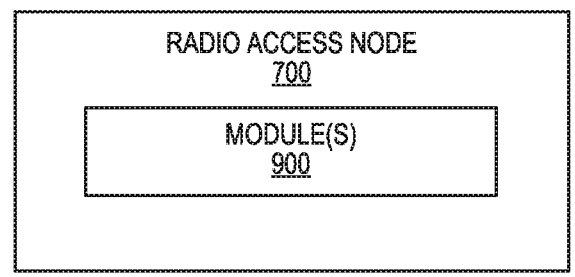
FIG. 9 is a schematic block diagram of the radio access node of FIG. 7 according to some other embodiments of the present disclosure.

FIG. 9 is a schematic block diagram of the radio access node 700 according to some other embodiments of the present disclosure. The radio access node 700 includes one or more modules 900, each of which is implemented in software. The module(s) 900 provide the functionality of the radio access node 700 described herein. This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 10:
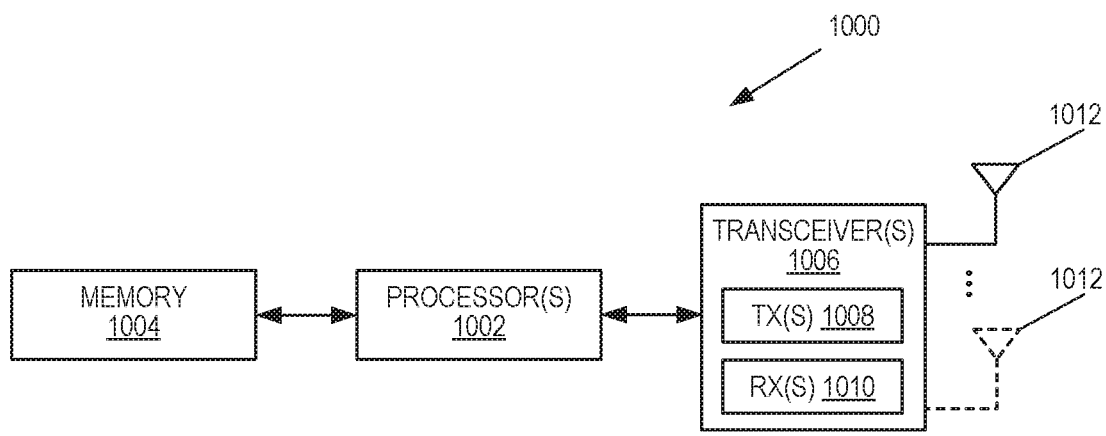
FIG. 10 is a schematic block diagram of a UE according to some embodiments of the present disclosure.

FIG. 10 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The processors 1002 are also referred to herein as processing circuitry. The transceivers 1006 are also referred to herein as radio circuitry. In some embodiments, the functionality of the UE 1000 described above may be fully or partially implemented in software that is, e.g., stored in the memory 1004 and executed by the processor(s) 1002. Note that the UE 1000 may include additional components not illustrated in FIG. 10 such as, e.g., one or more user interface components (e.g., a display, buttons, a touch screen, a microphone, a speaker(s), and/or the like), a power supply (e.g., a battery and associated power circuitry), etc.

In some embodiments, a computer program including instructions which, when executed by at least one processor, causes the at least one processor to carry out the functionality of the UE 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
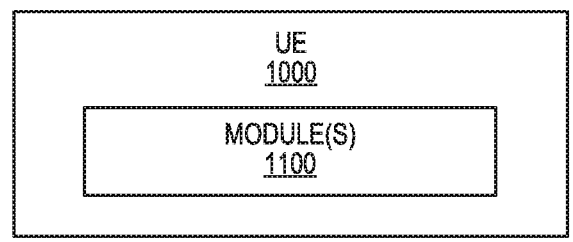
FIG. 11 is a schematic block diagram of the UE of FIG. 10 according to some other embodiments of the present disclosure.

FIG. 11 is a schematic block diagram of the UE 1000 according to some other embodiments of the present disclosure. The UE 1000 includes one or more modules 1100, each of which is implemented in software. The module(s) 1100 provide the functionality of the UE 1000 described herein.

Figure 12:
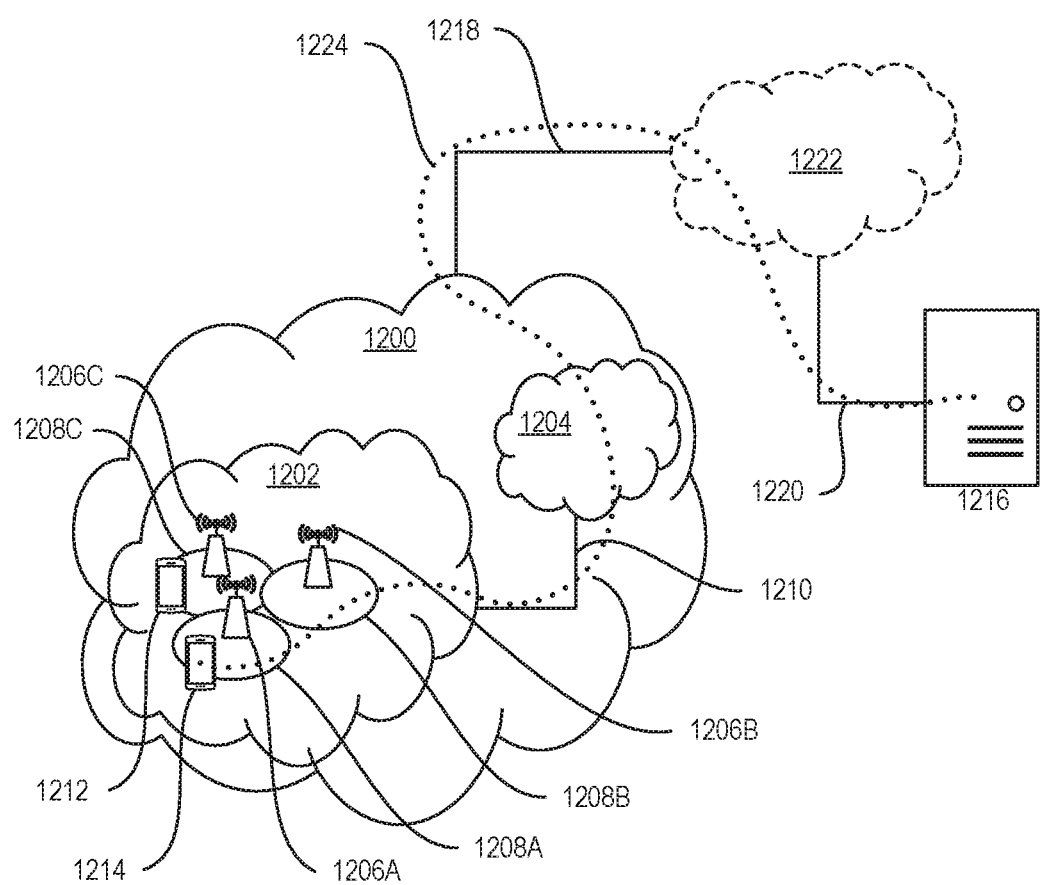
FIG. 12 illustrates a telecommunication network connected via an intermediate network to a host computer in accordance with some embodiments of the present disclosure.

FIG. 12 illustrates a telecommunication network connected via an intermediate network to a host computer in accordance with some embodiments of the present disclosure. With reference to FIG. 12, in accordance with an embodiment, a communication system includes a telecommunication network 1200, such as a 3GPP-type cellular network, which comprises an access network 1202, such as a RAN, and a core network 1204. The access network 1202 comprises a plurality of base stations 1206A, 1206B, 12060, such as NBs, eNBs, gNBs, or other types of wireless Access Points (APs), each defining a corresponding coverage area 1208A, 1208B, 1208C. Each base station 1206A, 1206B, 12060 is connectable to the core network 1204 over a wired or wireless connection 1210. A first UE 1212 located in coverage area 12080 is configured to wirelessly connect to, or be paged by, the corresponding base station 12060. A second UE 1214 in coverage area 1208A is wirelessly connectable to the corresponding base station 1206A. While a plurality of UEs 1212, 1214 are illustrated in this example, the disclosed embodiments are equally applicable to a situation where a sole UE is in the coverage area or where a sole UE is connecting to the corresponding base station 1206.

The telecommunication network 1200 is itself connected to a host computer 1216, which may be embodied in the hardware and/or software of a standalone server, a cloud-implemented server, a distributed server, or as processing resources in a server farm. The host computer 1216 may be under the ownership or control of a service provider, or may be operated by the service provider or on behalf of the service provider. Connections 1218 and 1220 between the telecommunication network 1200 and the host computer 1216 may extend directly from the core network 1204 to the host computer 1216 or may go via an optional intermediate network 1222. The intermediate network 1222 may be one of, or a combination of more than one of, a public, private, or hosted network; the intermediate network 1222, if any, may be a backbone network or the Internet; in particular, the intermediate network 1222 may comprise two or more sub-networks (not shown).

The communication system of FIG. 12 as a whole enables connectivity between the connected UEs 1212, 1214 and the host computer 1216. The connectivity may be described as an Over-the-Top (OTT) connection 1224. The host computer 1216 and the connected UEs 1212, 1214 are configured to communicate data and/or signaling via the OTT connection 1224, using the access network 1202, the core network 1204, any intermediate network 1222, and possible further infrastructure (not shown) as intermediaries. The OTT connection 1224 may be transparent in the sense that the participating communication devices through which the OTT connection 1224 passes are unaware of routing of uplink and downlink communications. For example, the base station 1206 may not or need not be informed about the past routing of an incoming downlink communication with data originating from the host computer 1216 to be forwarded (e.g., handed over) to a connected UE 1212. Similarly, the base station 1206 need not be aware of the future routing of an outgoing uplink communication originating from the UE 1212 towards the host computer 1216.

Example implementations, in accordance with an embodiment, of the UE, base station, and host computer discussed in the preceding paragraphs will now be described with reference to FIG. 13.

Figure 13:
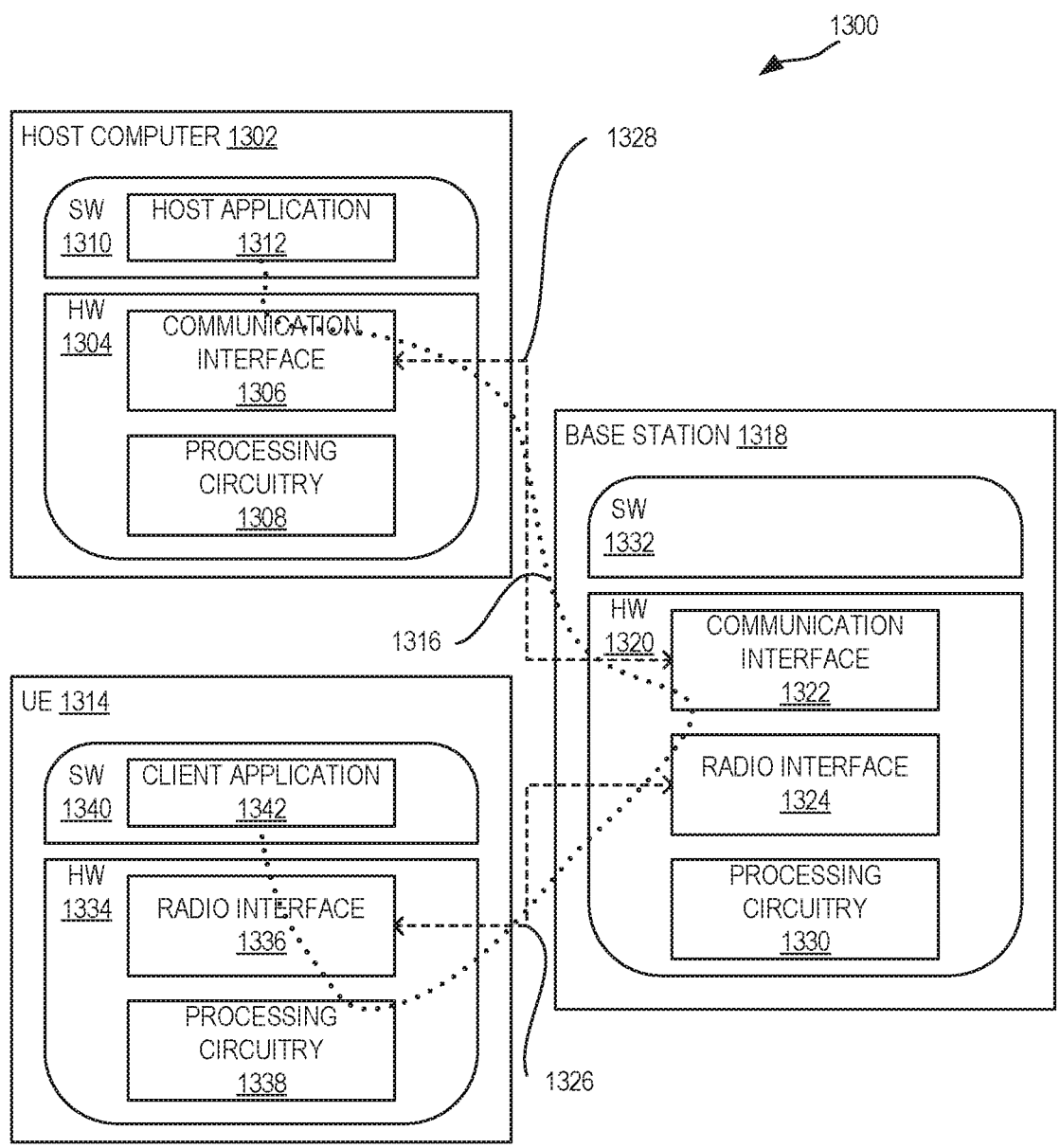
FIG. 13 is a generalized block diagram of a host computer communicating via a base station with a UE over a partially wireless connection in accordance with some embodiments of the present disclosure.

FIG. 13 is a generalized block diagram of a host computer communicating via a base station with a UE over a partially wireless connection in accordance with some embodiments of the present disclosure. In a communication system 1300, a host computer 1302 comprises hardware 1304 including a communication interface 1306 configured to set up and maintain a wired or wireless connection with an interface of a different communication device of the communication system 1300. The host computer 1302 further comprises processing circuitry 1308, which may have storage and/or processing capabilities. In particular, the processing circuitry 1308 may comprise one or more programmable processors, ASICs, FPGAs, or combinations of these (not shown) adapted to execute instructions. The host computer 1302 further comprises software 1310, which is stored in or accessible by the host computer 1302 and executable by the processing circuitry 1308. The software 1310 includes a host application 1312. The host application 1312 may be operable to provide a service to a remote user, such as a UE 1314 connecting via an OTT connection 1316 terminating at the UE 1314 and the host computer 1302. In providing the service to the remote user, the host application 1312 may provide user data which is transmitted using the OTT connection 1316.

The communication system 1300 further includes a base station 1318 provided in a telecommunication system and comprising hardware 1320 enabling it to communicate with the host computer 1302 and with the UE 1314. The hardware 1320 may include a communication interface 1322 for setting up and maintaining a wired or wireless connection with an interface of a different communication device of the communication system 1300, as well as a radio interface 1324 for setting up and maintaining at least a wireless connection 1326 with the UE 1314 located in a coverage area (not shown in FIG. 13) served by the base station 1318. The communication interface 1322 may be configured to facilitate a connection 1328 to the host computer 1302. The connection 1328 may be direct or it may pass through a core network (not shown in FIG. 13) of the telecommunication system and/or through one or more intermediate networks outside the telecommunication system. In the embodiment shown, the hardware 1320 of the base station 1318 further includes processing circuitry 1330, which may comprise one or more programmable processors, ASICs, FPGAs, or combinations of these (not shown) adapted to execute instructions. The base station 1318 further has software 1332 stored internally or accessible via an external connection.

The communication system 1300 further includes the UE 1314 already referred to. The UE's 1314 hardware 1334 may include a radio interface 1336 configured to set up and maintain a wireless connection 1326 with a base station serving a coverage area in which the UE 1314 is currently located. The hardware 1334 of the UE 1314 further includes processing circuitry 1338, which may comprise one or more programmable processors, ASICs, FPGAs, or combinations of these (not shown) adapted to execute instructions. The UE 1314 further comprises software 1340, which is stored in or accessible by the UE 1314 and executable by the processing circuitry 1338. The software 1340 includes a client application 1342. The client application 1342 may be operable to provide a service to a human or non-human user via the UE 1314, with the support of the host computer 1302. In the host computer 1302, the executing host application 1312 may communicate with the executing client application 1342 via the OTT connection 1316 terminating at the UE 1314 and the host computer 1302. In providing the service to the user, the client application 1342 may receive request data from the host application 1312 and provide user data in response to the request data. The OTT connection 1316 may transfer both the request data and the user data. The client application 1342 may interact with the user to generate the user data that it provides.

It is noted that the host computer 1302, the base station 1318, and the UE 1314 illustrated in FIG. 13 may be similar or identical to the host computer 1216, one of the base stations 1206A, 1206B, 12060, and one of the UEs 1212, 1214 of FIG. 12, respectively. This is to say, the inner workings of these entities may be as shown in FIG. 13 and independently, the surrounding network topology may be that of FIG. 12.

In FIG. 13, the OTT connection 1316 has been drawn abstractly to illustrate the communication between the host computer 1302 and the UE 1314 via the base station 1318 without explicit reference to any intermediary devices and the precise routing of messages via these devices. The network infrastructure may determine the routing, which may be configured to hide from the UE 1314 or from the service provider operating the host computer 1302, or both. While the OTT connection 1316 is active, the network infrastructure may further take decisions by which it dynamically changes the routing (e.g., on the basis of load balancing consideration or reconfiguration of the network).

The wireless connection 1326 between the UE 1314 and the base station 1318 is in accordance with the teachings of the embodiments described throughout this disclosure. One or more of the various embodiments improve the performance of OTT services provided to the UE 1314 using the OTT connection 1316, in which the wireless connection 1326 forms the last segment. More precisely, the teachings of these embodiments may make information collected by online service providers available to network automation and optimization processes and thereby provide benefits such as adjustment of mobility trajectories based on metrics not currently available for that purpose in conventional network architectures.

A measurement procedure may be provided for the purpose of monitoring data rate, latency, and other factors on which the one or more embodiments improve. There may further be an optional network functionality for reconfiguring the OTT connection 1316 between the host computer 1302 and the UE 1314, in response to variations in the measurement results. The measurement procedure and/or the network functionality for reconfiguring the OTT connection 1316 may be implemented in the software 1310 and the hardware 1304 of the host computer 1302 or in the software 1340 and the hardware 1334 of the UE 1314, or both. In some embodiments, sensors (not shown) may be deployed in or in association with communication devices through which the OTT connection 1316 passes; the sensors may participate in the measurement procedure by supplying values of the monitored quantities exemplified above, or supplying values of other physical quantities from which the software 1310, 1340 may compute or estimate the monitored quantities. The reconfiguring of the OTT connection 1316 may include message format, retransmission settings, preferred routing, etc.; the reconfiguring need not affect the base station 1314, and it may be unknown or imperceptible to the base station 1314. Such procedures and functionalities may be known and practiced in the art. In certain embodiments, measurements may involve proprietary UE signaling facilitating the host computer 1302's measurements of throughput, propagation times, latency, and the like. The measurements may be implemented in that the software 1310 and 1340 causes messages to be transmitted, in particular empty or 'dummy' messages, using the OTT connection 1316 while it monitors propagation times, errors, etc.

Figures 14, 15:
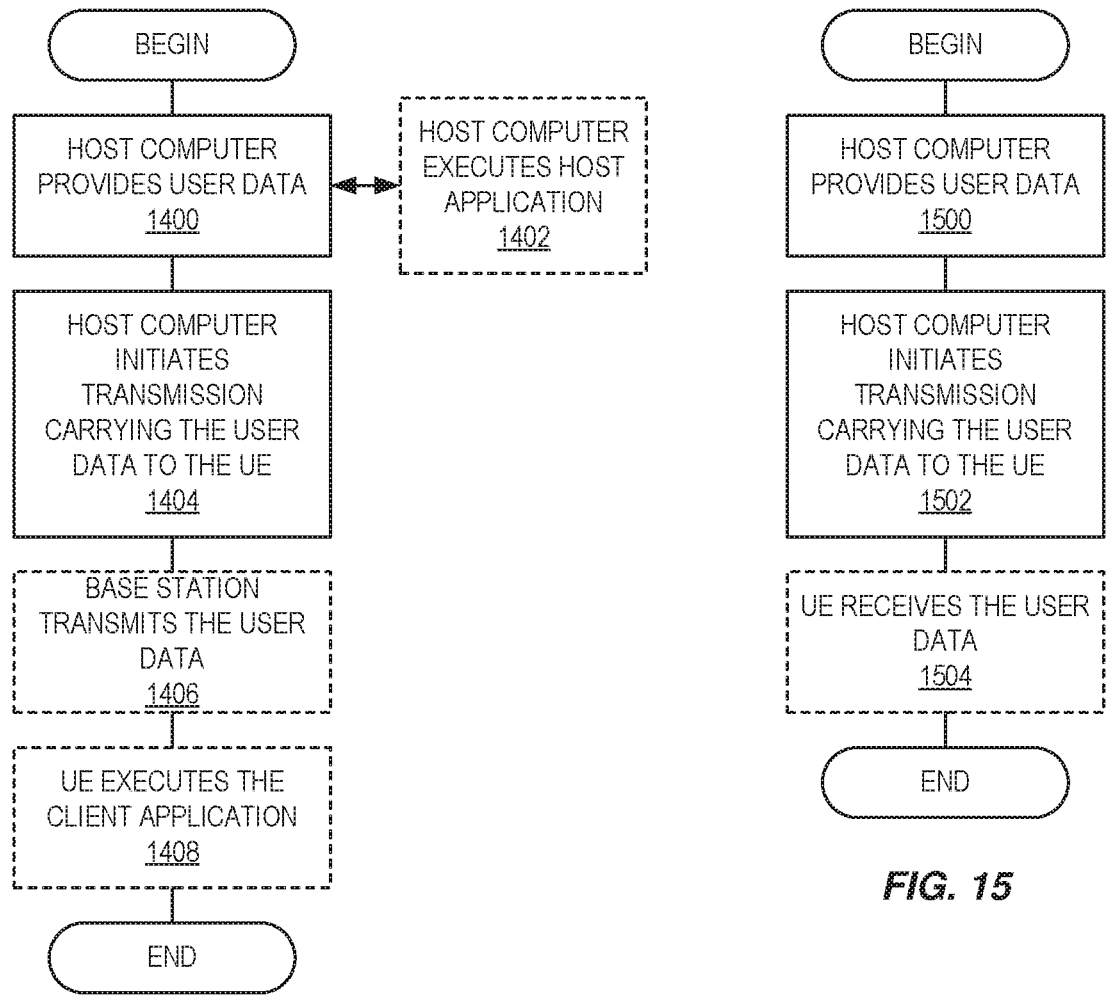
FIG. 14 is a flowchart illustrating a method implemented in a communication system in accordance with one embodiment of the present disclosure.
FIG. 15 is a flowchart illustrating a method implemented in a communication system in accordance with one embodiment of the present disclosure.

FIG. 14 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 14 will be included in this section. In step 1400, the host computer provides user data. In sub-step 1402 (which may be optional) of step 1400, the host computer provides the user data by executing a host application. In step 1404, the host computer initiates a transmission carrying the user data to the UE. In step 1406 (which may be optional), the base station transmits to the UE the user data which was carried in the transmission that the host computer initiated, in accordance with the teachings of the embodiments described throughout this disclosure. In step 1408 (which may also be optional), the UE executes a client application associated with the host application executed by the host computer.

FIG. 15 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 15 will be included in this section. In step 1500 of the method, the host computer provides user data. In an optional sub-step (not shown) the host computer provides the user data by executing a host application. In step 1502, the host computer initiates a transmission carrying the user data to the UE. The transmission may pass via the base station, in accordance with the teachings of the embodiments described throughout this disclosure. In step 1504 (which may be optional), the UE receives the user data carried in the transmission.

Figures 16, 17:
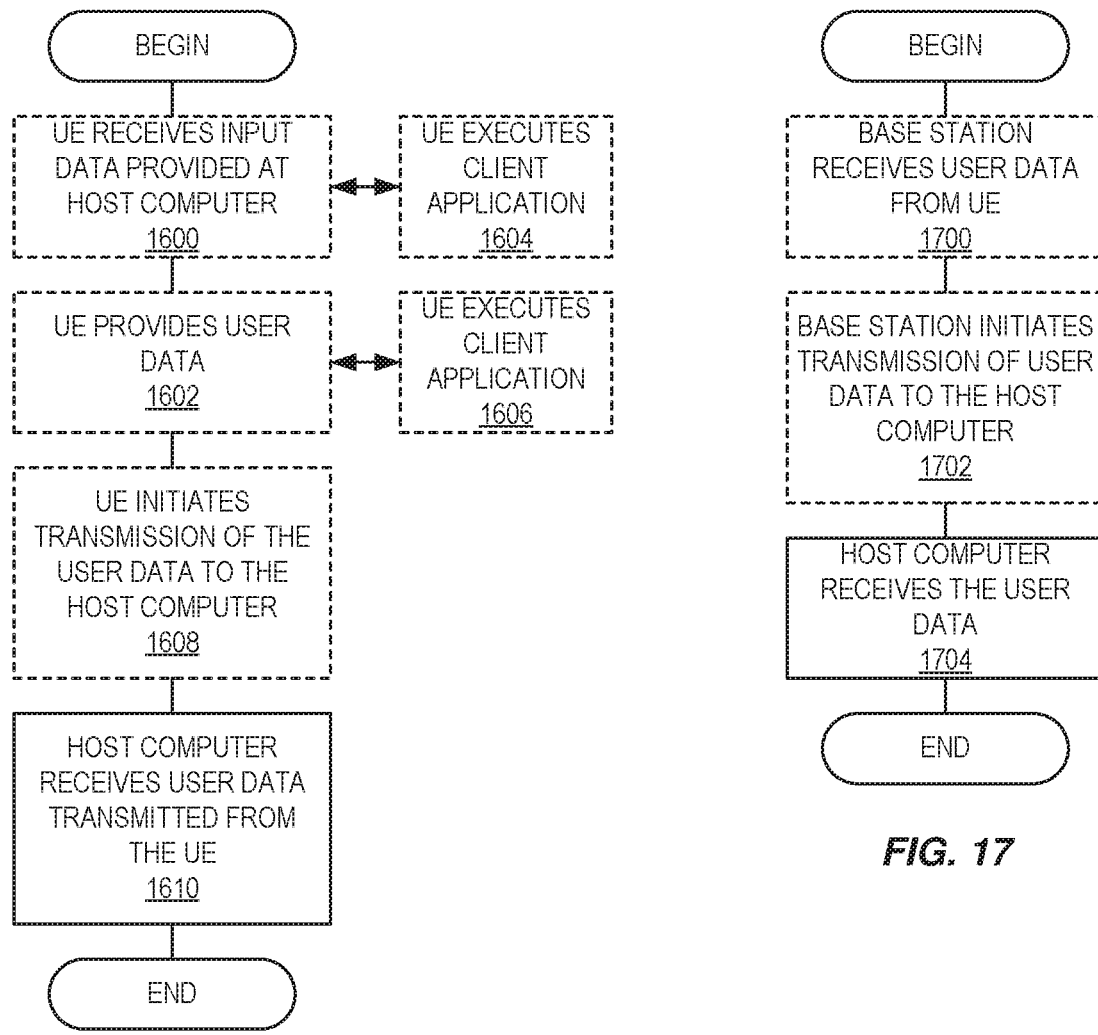
FIG. 16 is a flowchart illustrating a method implemented in a communication system in accordance with one embodiment on the present disclosure.
FIG. 17 is a flowchart illustrating a method implemented in a communication system in accordance with one embodiment of the present disclosure.

FIG. 16 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 16 will be included in this section. In step 1600 (which may be optional), the UE receives input data provided by the host computer. Additionally or alternatively, in step 1602, the UE provides user data. In sub-step 1604 (which may be optional) of step 1600, the UE provides the user data by executing a client application. In sub-step 1606 (which may be optional) of step 1602, the UE executes a client application which provides the user data in reaction to the received input data provided by the host computer. In providing the user data, the executed client application may further consider user input received from the user. Regardless of the specific manner in which the user data was provided, the UE initiates, in sub-step 1608 (which may be optional), transmission of the user data to the host computer. In step 1610 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1700 (which may be optional), in accordance with the teachings of the embodiments described throughout this disclosure, the base station receives user data from the UE. In step 1702 (which may be optional), the base station initiates transmission of the received user data to the host computer. In step 1704 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
5G-NR Fifth Generation New Radio
5QI Fifth Generation Quality of Service Indicator
AF Application Function
AFBE Application Function Backend
AMF Core Access and Mobility Management Function
AP Access Point
API Application Programming Interface
ASIC Application Specific Integrated Circuit
CN Core Network
CPE Customer Premise Equipment
CPU Central Processing Unit
DSP Digital Signal Processor
eNB Enhanced or Evolved Node B
FPGA Field Programmable Gate Array
gNB New Radio Base Station
GPS Global Positioning System
ID Identifier/Identity
IMEI International Mobile Equipment Identity
IMSI International Mobile Subscriber Identity
IoT Internet of Things
IP Internet Protocol
KPI Key Performance Indicator
LTE Long Term Evolution
LTE-A Long Term Evolution Advanced
LTE-M Long Term Evolution for Machine Type Communication
MAC Media Access Control
MME Mobility Management Entity
MNO Mobile Network Operator
MSISDN Mobile Station International Subscriber Directory Number MTC Machine Type Communication
NB-IoT Narrowband Internet of Things
NEF Network Exposure Function
NF Network Function
NG Next Generation
NG-RAN Next Generation Radio Access Network
NR New Radio
NSSAI Network Slice Selection Assistance Information
NSSF Network Slice Selection Function
NWDA Network Data Analytics
O&M Operation and Maintenance
OTT Over-the-Top
P-GW Packet Data Network Gateway
PLMN Public Land Mobile Network
QCI Quality of Service (QoS) Class Identifier
QoS Quality of Service
QoE Quality of Experience
RAM Random Access Memory
RAN Radio Access Network
RAT Radio Access Technology
REST Representational State Transfer
RFSP Radio Access Technology Frequency Selection Priority
ROM Read Only Memory
RRH Remote Radio Head
RRU Remote Radio Unit
SCEF Service Capability Exposure Function
SINR Signal and Interference to Noise ratio
SPID Subscriber Profile Identifier
SSID Service Set Identifier
TMSI Temporary Mobile Subscriber Identity
TOA Time Of Arrival
TR Technical Report
UE User Equipment
UGI User Equipment-Generated Information
UP User Plane
UPF User Plane Function Those skilled in the art will recognize improvements and modifications to the embodiments of the present disclosure. All such improvements and modifications are considered within the scope of the concepts disclosed herein.

What is claimed is:

1. A method for an online services application or Application Function, AF, to provide User Equipment, UE, -Generated Information, UGI, to support network automation and optimization, the method comprising:
   at a Network Data Analytics function, NWDA:
      receiving UGI that was collected by an online services application within or connected to a UE or by an online services AF;
      generating network automation and optimization information based on at least some of the received UGI; and
      sending the network automation and optimization information to a Next Generation Radio Access Network, NG-RAN, wherein sending the network automation and optimization information comprises sending a handover request that comprises at least one of:
         a Radio Access Technology, RAT, Frequency Selection Priority, RFSP, index;
         a Subscriber Profile Identifier, SPID;
         a Fifth Generation, 5G, Quality of Service, QoS, Indicator, 5QI;
         a QoS Class Indicator, QCI;
         a 5G Temporary Mobile Subscriber Identity, TMSI, range; or
         Core Access and Mobility Management Function, AMF, Core Network, CN, assistance information.

2. The method of claim 1 wherein receiving the UGI comprises receiving the UGI from the online services AF via a Network Exposure Function, NEF, or via a User Plane Function, UPF.

3. The method of claim 1 wherein receiving the UGI comprises receiving, from the UE, the UGI collected by an online services application on the UE.

4. The method of claim 1 wherein receiving the UGI comprises receiving the UGI using a Representational State Transfer, REST,-ful Application Programming Interface, API.

5. The method of claim 1 wherein sending the network automation and optimization information to the RAN comprises sending the network automation and optimization information to the RAN via a Core Access and Mobility Management Function, AMF.

6. The method of claim 5 wherein generating the network automation and optimization information comprises generating mobility management and optimization information.

7. The method of claim 1 wherein sending the handover request to the NG RAN comprises sending the handover request to the NG-RAN via an Operations and Management, O&M, node.

8. The method of claim 7 wherein the handover request comprises at least one of:
   the RAT RFSP index; or
   the SPID.

9. The method of claim 7 wherein the handover request comprises at least one of:
   the 5QI;
   the QCI;
   the TMSI range; or
   the AMF CN assistance information.

10. The method of claim 1 wherein the UGI comprises information that was provided by at least one reporting UE.

11. The method of claim 10 wherein the UGI comprises at least one of:
    information identifying the reporting UE;
    location, positioning, or sensor information;
    network coverage information;
    signal quality information;
    information identifying a network connection;
    device specific information; and
    information related to nearby devices.

12. The method of claim 11 wherein the information identifying the reporting UE comprises at least one of:
    a Media Access Control, MAC, address;
    an International Mobile Subscriber Identity, IMSI;
    an International Mobile Equipment Identity, IMEI; and
    a Mobile Station International Subscriber Directory Number, MSISDN.

13. The method of claim 11 wherein the location, positioning, or sensor information comprises at least one of:
    a light/brightness level of the reporting UE;
    a noisy/sounds level around of the reporting UE;
    an infrared/motion level around of the reporting UE;
    a heat/temperature level of the reporting UE;
    an air humidity level of the reporting UE;
    a latitude and longitude of the reporting UE;
    an altitude of the reporting UE; and
    a speed of movement of the reporting UE.

14. The method of claim 11 wherein the network coverage information comprises at least one of:
    information relating to a lack of coverage by any network technology supported by the reporting UE;

information relating to a lack of Third Generation Partnership Project, 3GPP, coverage but a presence of non-3GPP coverage by the reporting UE;

an indication of a type of the non-3GPP coverage detected by the reporting UE; and an indication of a change of mobile network technologies by the reporting UE.

15. The method of claim 11 wherein the signal quality information comprises information relating to at least one of:
   a signal strength;
   a Signal and Interference to Noise Ratio, SINR;
   a quality of an air interface;
   average user latency;
   average jitter;
   average packet loss;
   average ping time;
   average Time Of Arrival, TOA, of a first packet;
   channel bandwidth capability;
   average user throughput; and
   actual user throughput of most used applications and services;
of any network technology supported by the reporting UE.

16. The method of claim 11 wherein the information identifying the network connection comprises at least one of:
   a Radio Access Technology, RAT;
   a Public Land Mobile Network, PLMN, Identifier, ID;
   a list of Cell Identifiers, Cell IDs, of cells detected by the reporting UE;
   a list of carriers of each Cell ID of the cells detected by the reporting UE;
   a list of Non-Third Generation Partnership Project, 3GPP, network identifiers; and
   a list of WiFi Service Set Identifiers, SSIDs.

17. The method of claim 11 wherein the device specific information comprises information specific to the reporting UE.

18. The method of claim 17 wherein the information specific to the reporting UE comprises at least one of:
   a preferred network node of the reporting UE;
   a Radio Access Technology, RAT, supported by the reporting UE;
   an indication that WiFi was enabled or disabled on the reporting UE;
   a model number of the reporting UE;
   a serial number of the reporting UE;
   a device identifier of the reporting UE;
   a device type of the reporting UE;
   a date and/or time that the reporting UE reported the information;
   an operating system version of the reporting UE;
   a battery level of the reporting UE;
   an identity for advertisers of the reporting UE;
   a Google Play Service ID of the reporting UE;
   a time of service of the reporting UE; and
   an application version code of the reporting UE.

19. The method of claim 11 wherein the information related to nearby devices comprises Key Performance Indicators, KPIs, of comparable nearby UEs on a same or different service provider and on a same or different radio access technology.

20. The method of claim 1 wherein the UGI comprises information specific to a single UE, and generating network automation and optimization information based on at least some of the received UGI comprises generating network automation and optimization information based on information specific to a single UE.

21. The method of claim 1 wherein the UGI comprises information aggregated from a plurality of UEs, and generating network automation and optimization information based on at least some of the received UGI comprises generating network automation and optimization information based on information aggregated from a plurality of UEs.

22. The method of claim 21 wherein generating network automation and optimization information based on at least some of the received UGI comprises generating network automation and optimization information based on information aggregated from an identified subset of the plurality of UEs.

23. The method of claim 1 wherein the network automation and optimization information comprises information used by the RAN for handover decisions or performance decisions associated with single UE or a plurality of UEs.

24. The method of claim 23 wherein the performance decisions comprise decisions affecting the performance of the serving cell and/or neighboring cells.

25. The method of claim 23 wherein the information used by the RAN for handover within the same RAT for another serving cell, or for a different 3GPP/Non-3GPP and performance improvement decisions within the same serving cell and/or neighbors cells comprises information related to at least one of:
   selecting a target cell for handover or deciding to remain in the same serving cell for more time;
   selecting a 3GPP or non-3GPP RAT;
   allocating a registration area;
   optimizing paging;
   selecting a tracking area;
   triggering a handover;
   selecting a network slice;
   optimizing a RAT parameter or feature to maximize performance or reduce operating costs;
   activating or deactivating a parameter or feature to maximize performance or reduce operating costs; and
   activating or deactivating a network resource to maximize performance or reduce operating costs.

26. The method of claim 1 wherein the RAN comprises a NG-RAN.

* * * * *